US009504359B2

(12) United States Patent
Seckler et al.

(10) Patent No.: US 9,504,359 B2
(45) Date of Patent: Nov. 29, 2016

(54) MOLDED WALL UNIT INCLUDING A CORNER BRACKET

(71) Applicant: Delta Faucet Company, Indianapolis, IN (US)

(72) Inventors: Bernd Seckler, McCordsville, IN (US); Michael Scot Rosko, Greenwood, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 15/044,662

(22) Filed: Feb. 16, 2016

(65) Prior Publication Data
US 2016/0160496 A1   Jun. 9, 2016

Related U.S. Application Data

(63) Continuation-in-part of application No. 14/738,427, filed on Jun. 12, 2015.

(60) Provisional application No. 62/117,931, filed on Feb. 18, 2015, provisional application No. 62/012,743, filed on Jun. 16, 2014.

(51) Int. Cl.
*A47K 3/02* (2006.01)
*A47K 3/28* (2006.01)
(Continued)

(52) U.S. Cl.
CPC ............ *A47K 3/28* (2013.01); *B29C 33/3857* (2013.01); *E04F 13/0873* (2013.01);
(Continued)

(58) Field of Classification Search
CPC .......... B29C 33/3857; B29K 2055/02; B29L 2031/776; E04B 1/6815; E04F 13/072; E04F 13/0873; E04F 13/0898

USPC ....... 52/235, 272, 459, 461, 506.01, 746.12; 4/596, 600, 612, 613, 614

See application file for complete search history.

(56) References Cited

U.S. PATENT DOCUMENTS 2,202,568 A * 5/1940 Worden .............. E04F 13/0801
52/385
3,055,148 A 9/1962 Christy
(Continued)

FOREIGN PATENT DOCUMENTS

CN    102720376    10/2012
DE    102006037796    2/2008
(Continued)

OTHER PUBLICATIONS

Duma-Pan Interlocking PVC Panels, Decorative Interlocking PVC Walls and Ceiling Panels, retrieved on Dec. 12, 2014 from http://www.dumaplast.ca.
(Continued)

*Primary Examiner* — James Buckle, Jr.
(74) *Attorney, Agent, or Firm* — Faegre Baker Daniels, LLP

(57) ABSTRACT

A bathroom wall unit includes a molded wall panel formed of a polymer and defining a recessed pocket. A flexible substrate supporting mosaic tiles is illustratively coupled to a rear wall of the recessed pocket. Surface treatment is illustratively provided within linear indentations in the wall panel to simulate grout lines. A corner bracket illustratively includes first and second trios of arms supporting seals and defining first, second, and third recesses for receiving mounting flanges of a pair of wall panels and a locking device of an inner sealing body to provide additional seals with the wall panels.

23 Claims, 17 Drawing Sheets

(51) Int. Cl.
| | |
|---|---|
| *E04F 13/08* | (2006.01) |
| *B29C 33/38* | (2006.01) |
| *E04F 13/18* | (2006.01) |
| *E04F 19/02* | (2006.01) |
| *E04F 19/06* | (2006.01) |
| *B29K 55/02* | (2006.01) |
| *B29L 31/00* | (2006.01) |

(52) U.S. Cl.
CPC ........ *E04F 13/0898* (2013.01); *E04F 13/185* (2013.01); *E04F 19/02* (2013.01); *E04F 19/064* (2013.01); *B29K 2055/02* (2013.01); *B29L 2031/776* (2013.01)

(56) References Cited

U.S. PATENT DOCUMENTS

| | | | | |
|---|---|---|---|---|
| 3,691,711 | A | * | 9/1972 | Lowery .................... E04B 2/60 52/282.3 |
| 3,992,825 | A | * | 11/1976 | May .................... E04F 13/0889 52/146 |
| 4,128,982 | A | | 12/1978 | Weaver |
| 4,169,907 | A | | 10/1979 | Barker et al. |
| 4,289,818 | A | | 9/1981 | Casamayor |
| 4,384,377 | A | | 5/1983 | Calvert et al. |
| 4,385,850 | A | * | 5/1983 | Bobath ................. F16B 5/0068 403/205 |
| 4,671,026 | A | * | 6/1987 | Wissinger ............. A47K 3/001 206/453 |
| 4,689,930 | A | * | 9/1987 | Menchetti ............. E04B 2/7409 52/275 |
| 4,917,528 | A | * | 4/1990 | Shewchuk .............. F16B 2/065 118/108 |
| 4,993,201 | A | | 2/1991 | Bunyard |
| 5,142,836 | A | | 9/1992 | Kearns |
| 5,159,723 | A | | 11/1992 | Benedict |
| 5,263,294 | A | | 11/1993 | Koenig et al. |
| 5,280,052 | A | | 1/1994 | Questel et al. |
| 5,303,519 | A | * | 4/1994 | Mustee et al. ......... A47K 3/283 52/34 |
| 5,444,953 | A | | 8/1995 | Koenig et al. |
| 5,606,752 | A | * | 3/1997 | Shenton, Jr. ............. A47K 3/38 160/349.2 |
| 5,619,826 | A | * | 4/1997 | Wu ........................ E04H 1/1216 52/35 |
| 5,806,270 | A | | 9/1998 | Solano et al. |
| 5,866,225 | A | | 2/1999 | Crossley |
| 5,950,370 | A | | 9/1999 | Peck |
| 6,199,545 | B1 | | 3/2001 | Adamson |
| 6,264,873 | B1 | | 7/2001 | Gigl et al. |
| 6,311,442 | B1 | * | 11/2001 | Watanabe ............... E04B 2/707 156/91 |
| 6,413,618 | B1 | | 7/2002 | Parker et al. |
| 6,516,476 | B1 | * | 2/2003 | Thums ................ E04F 13/0862 4/584 |
| 6,551,678 | B1 | | 4/2003 | O'Brien et al. |
| 6,751,916 | B1 | | 6/2004 | Ritzer et al. |
| 7,028,349 | B2 | | 4/2006 | Helmetsie et al. |
| 7,383,670 | B1 | | 6/2008 | Meyers |
| 7,562,504 | B2 | * | 7/2009 | Herbst ................. E04F 13/0889 52/235 |
| 7,748,527 | B2 | | 7/2010 | Wisecarver et al. |
| 7,877,825 | B1 | * | 2/2011 | Marshall .................. A47K 3/30 4/612 |
| 8,141,182 | B2 | | 3/2012 | Cook |
| 8,201,373 | B2 | | 6/2012 | Charles, Jr. |
| 8,484,771 | B2 | | 7/2013 | Wilson et al. |
| 8,603,613 | B2 | | 12/2013 | Larson |
| 8,702,886 | B2 | | 4/2014 | Yaniv et al. |
| 8,869,321 | B2 | | 10/2014 | Donnelly et al. |
| 2002/0071930 | A1 | | 6/2002 | Oakey et al. |
| 2004/0078890 | A1 | * | 4/2004 | Tavivian .................. A47K 3/30 4/596 |
| 2004/0093819 | A1 | | 5/2004 | Ritzer |
| 2004/0226230 | A1 | | 11/2004 | Ritzer |
| 2005/0086736 | A1 | * | 4/2005 | Helmetsie ................ A47K 3/30 4/596 |
| 2005/0129913 | A1 | | 6/2005 | Kobayashi et al. |
| 2007/0117496 | A1 | | 5/2007 | Maron |
| 2007/0187864 | A1 | | 8/2007 | Mincey et al. |
| 2008/0022452 | A1 | * | 1/2008 | Lock ...................... A47K 3/284 4/614 |
| 2008/0115437 | A1 | | 5/2008 | Bordener |
| 2008/0250558 | A1 | | 10/2008 | Torres |
| 2008/0313981 | A1 | | 12/2008 | Donley et al. |
| 2009/0266804 | A1 | * | 10/2009 | Costin ................. B29C 47/0014 219/121.85 |
| 2009/0313919 | A1 | | 12/2009 | Chuang |
| 2010/0176101 | A1 | | 7/2010 | Costin et al. |
| 2010/0183822 | A1 | | 7/2010 | Ruggie et al. |
| 2010/0263323 | A1 | | 10/2010 | Trinidade et al. |
| 2012/0082839 | A1 | | 4/2012 | Ha et al. |
| 2012/0288642 | A1 | | 11/2012 | Smith |
| 2012/0317913 | A1 | | 12/2012 | Esquivel |
| 2013/0019552 | A1 | * | 1/2013 | Murdock ............ E04F 13/0862 52/506.01 |
| 2013/0104757 | A1 | | 5/2013 | Smith |
| 2013/0265350 | A1 | | 10/2013 | Costin, Sr. et al. |
| 2013/0276226 | A1 | | 10/2013 | Cook et al. |
| 2013/0284355 | A1 | | 10/2013 | Farrage, Jr. et al. |
| 2014/0250585 | A1 | | 9/2014 | Slothower et al. |
| 2014/0259369 | A1 | | 9/2014 | Zimbric |
| 2015/0074897 | A1 | * | 3/2015 | Cook ...................... A47K 3/008 4/612 |
| 2015/0107018 | A1 | * | 4/2015 | Vagedes .................. A47K 3/02 4/584 |
| 2015/0361673 | A1 | | 12/2015 | Rosko et al. |

FOREIGN PATENT DOCUMENTS

| | | |
|---|---|---|
| EP | 1 726 737 B1 | 9/2010 |
| GB | 1207685 | 10/1970 |
| GB | 2 418 933 | 4/2006 |
| GB | 2 452 979 | 3/2009 |
| WO | WO 2009/050476 | 4/2009 |
| WO | WO 2011/142759 | 11/2011 |
| WO | WO 2012/059712 | 5/2012 |
| WO | WO 2013/049927 | 4/2013 |

OTHER PUBLICATIONS

Acrylic Bathroom Wall Panels, A Guide to Selecting and Purchasing Acrylic Bathroom Wall Panels, retrieved from https://sites.google.com/site/acrylicbathroomwallpanels on Dec. 5, 2014.
Zelletex, PVC Shower Wall Paneling, retrieved from http://zelletex.com.au/pvc-bathroom-panels/pvc-shower-panelling on Dec. 5, 2014.
Gruber, Molds: Wall Panels, retrieved from http:www.gruber-systems.com/products/molds/wallpanel-molds.html on Dec. 5, 2014.
Array Showers; Solid Surface Shower Systems and Sheets, retrieved from http://www.arrayshowers.com on Dec. 5, 2014.
American Standard, ACRYLUX 60 Inch by 30 Inch Tile Bath Wall Set; retrieved from http://m.americanstandard-us.com/products/product_detail.aspx?id=2101 on Dec. 5, 2014.
Mosaic Art Supply; Tile Mounting Grid; http://www.mosaicartsupply.com/mounting-grid-3-4-inch-mosaic-tile-aspx; Feb. 12, 2014.
Decorating Ceramic Tiles; http://www.taptilecontrols.com/bathroom/podfs/manuals/Tile_decoration_v3.pdf; 2013; 4 pgs.
Best Bath Systems; Best Bath Systems® Bathing Solutions; © 2015; 2 pgs.

* cited by examiner

MOLDED WALL UNIT INCLUDING A CORNER BRACKET

CROSS-REFERENCE TO RELATED APPLICATIONS

This application is a continuation-in-part of U.S. patent application Ser. No. 14/738,427, filed Jun. 12, 2015, which claims priority to U.S. Provisional Patent Application Ser. No. 62/117,931, filed Feb. 18, 2015, and to U.S. Provisional Application Ser. No. 62/012,743, filed Jun. 16, 2014, the disclosures of which are expressly incorporated herein by reference.

BACKGROUND AND SUMMARY

The present invention relates generally to molded wall panels and, more particularly, to molded wall panels with connecting brackets for use in bathroom tub and shower installations.

It is well known to provide tub and shower wall panels molded from a polymer to simulate ceramic tile. More particularly, such wall panels typically include indentations between adjacent rectangular raised portions to simulate grout lines between adjacent tiles. However, such molded wall panels often fail to closely resemble ceramic tiles with conventional grout lines. Additionally, such molded wall panels typically provide a limited number of design options.

Consumers would like to have the ability to customize their tub and shower walls, but often cannot afford a complete tile installation. While many consumers would prefer to have ceramic tile installations, this is often prohibitive due to cost and installation time.

As such, it is desired to provide cost effective, molded wall panels that more closely resemble the appearance of traditional ceramic tile and authentic grout lines, and that are simple to install. Additionally, it is desired to provide such molded wall panels that include a variety of design options that may be customized by the user.

According to an illustrative embodiment of the present disclosure, a corner bracket for a shower enclosure includes an outer receiver including an outer receiver body defining first outer recess configured to receive a first wall panel, a second outer recess configured to receive a second wall panel, and a center recess positioned intermediate the first outer recess and the second outer recess. An insert is operably coupled to the outer receiver, the insert including an inner sealing body received within the center recess of the outer receiver body. A locking device is supported by the outer receiver body and the inner sealing body, the locking device configured to secure the inner sealing body to the outer receiver body.

According to another illustrative embodiment of the present disclosure, a corner bracket for a shower enclosure includes an outer receiver coupled to a first mounting stud and a second mounting stud. A body of the outer receiver is formed of a first material and includes a first inner arm, a first middle arm, and a first outer arm. The body also includes a second inner arm, a second middle arm, and a second outer arm. The first outer arm and the first middle arm define a first recess, the second outer arm and the second middle arm define a second recess, and the first inner arm and the second inner arm define a third recess. Both the first inner arm and the second inner arm have a plurality of raised surfaces extending into the third recess. The corner bracket also includes a first wall panel received within the first recess, a second wall panel received within the second recess, and an inner sealing body including a locking device that is received within the third recess and coupled to the body by the plurality of raised surfaces.

In a further illustrative embodiment of the present disclosure, a method of forming a bathroom wall unit includes the steps of mounting a corner bracket to a wall stud, coupling a first wall panel to the corner bracket within a first recess of the corner bracket, and coupling a sealing body to the corner bracket and the first wall panel such that a fluid tight seal exists at the interface of the first wall panel and the sealing body.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
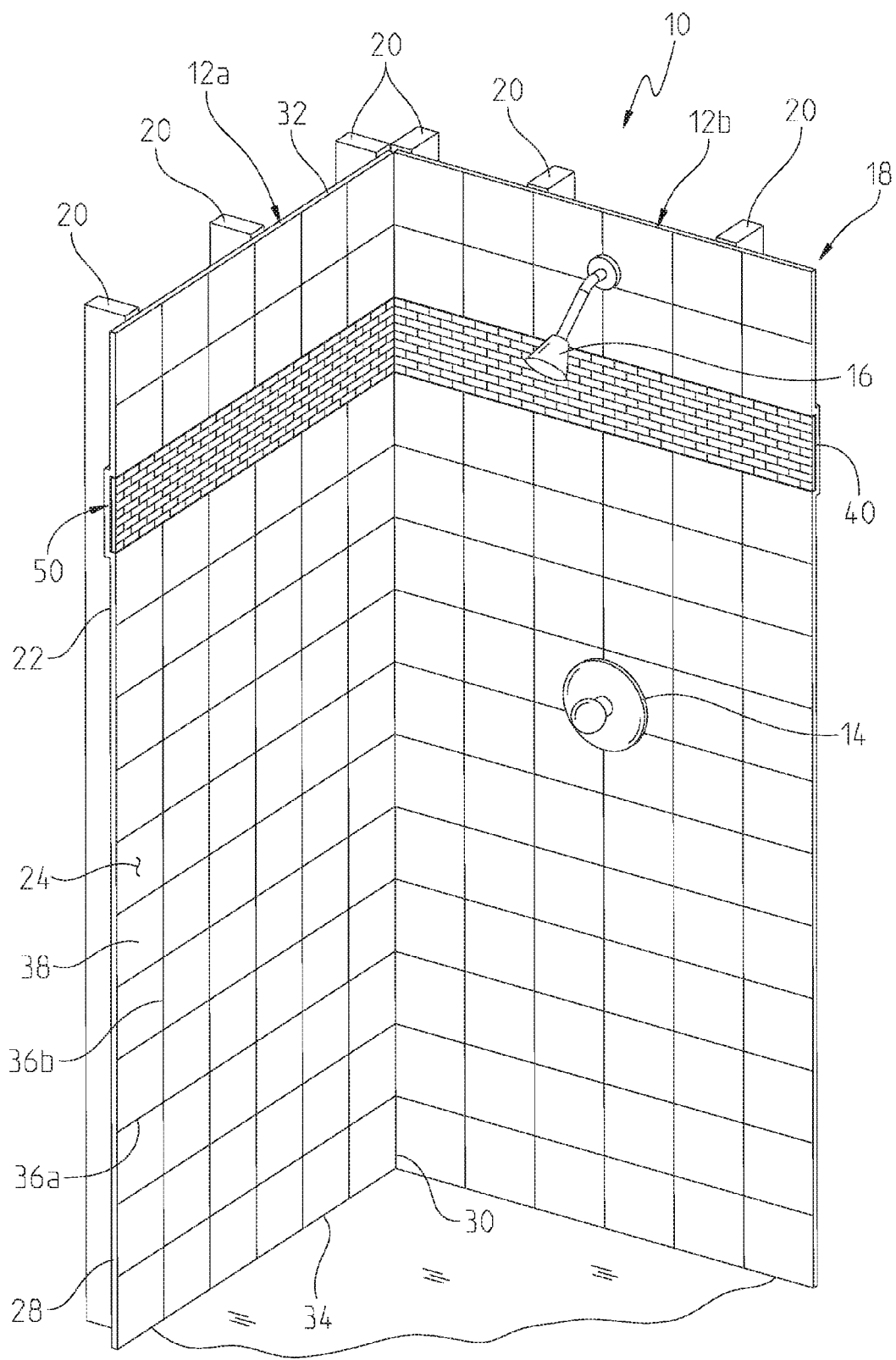
FIG. 1 is a perspective view of an illustrative shower enclosure including wall units of the present disclosure.

Referring initially to FIG. 1, a shower enclosure 10 including illustrative bathroom wall units 12a, 12b of the present disclosure is shown. The shower enclosure 10 supports a faucet 14 for controlling water flow through a showerhead 16. The wall units 12a, 12b are illustratively supported by a wall 18 including mounting studs 20. While the wall units 12 are shown for use with a shower enclosure 10, it should be appreciated that the wall units 12 may be used in a variety of installations, such as in connection with bath tubs, vanities and kitchens.

Figure 2:
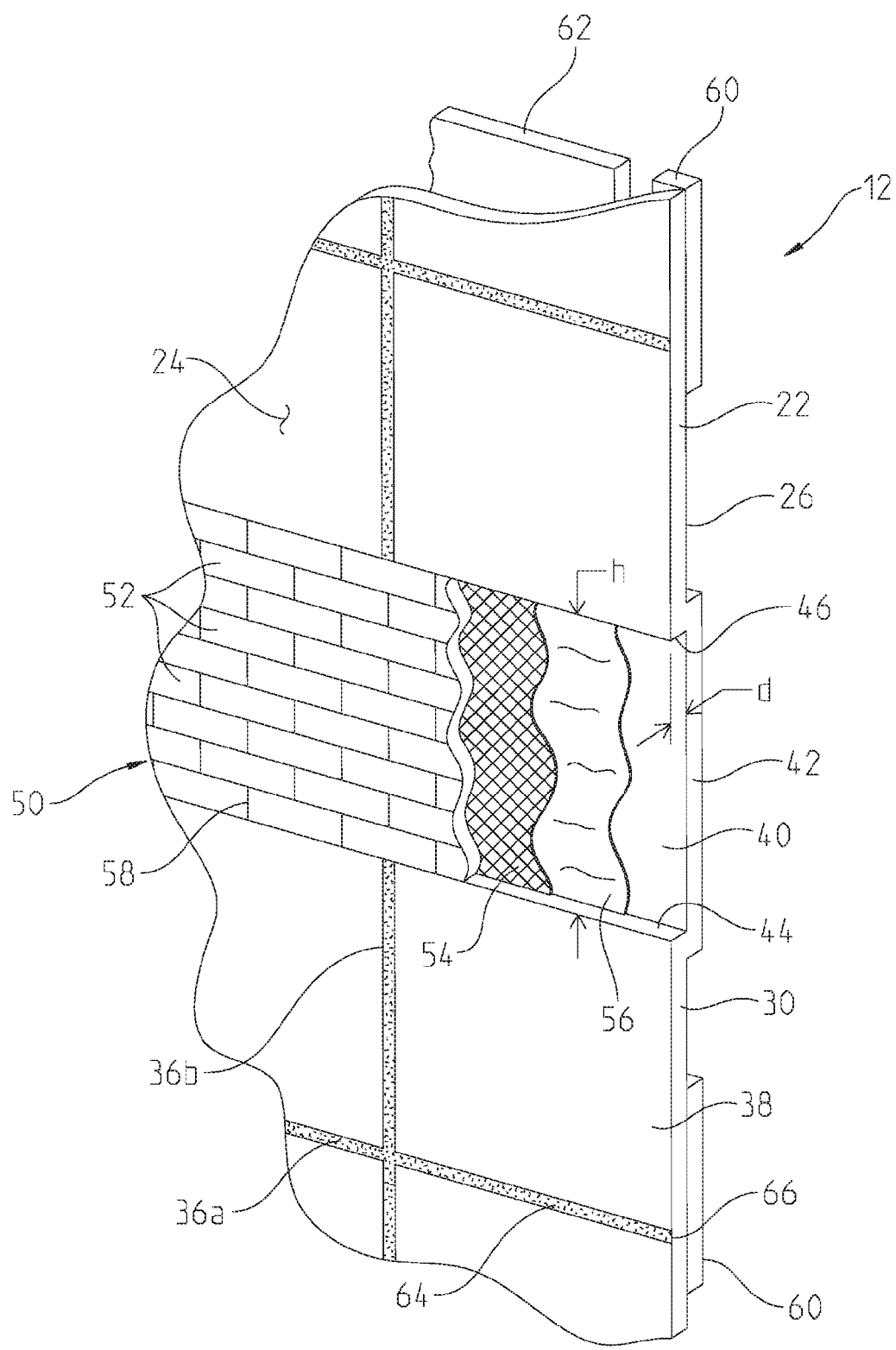
FIG. 2 is a perspective view, with partial cut-aways, of a wall unit of FIG. 1.
Figure 3:
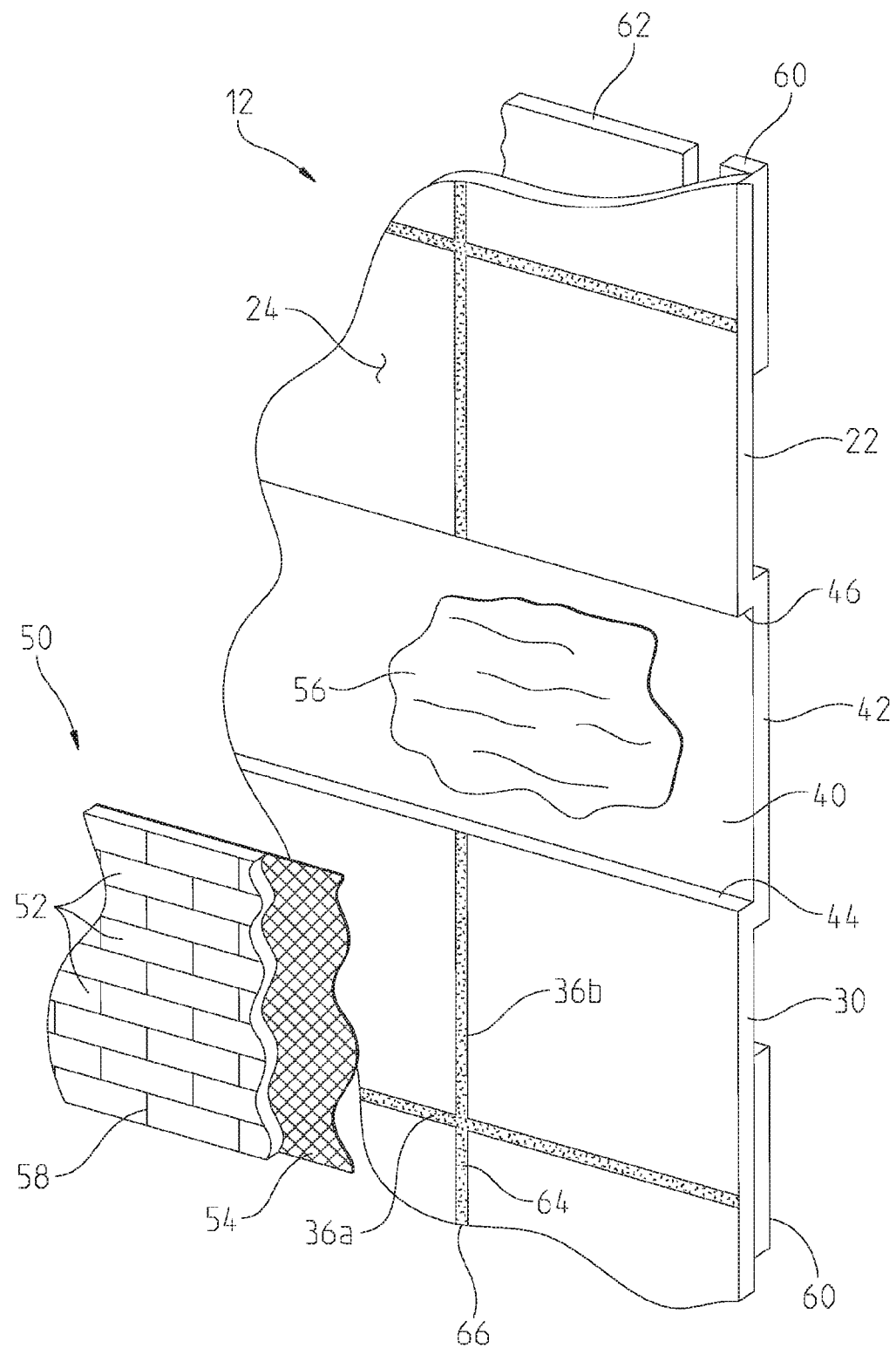
FIG. 3 is an exploded perspective view, with partial cut-aways, of the wall unit of FIG. 2.

With reference to FIGS. 1-3, each wall unit 12 includes a molded wall panel 22 including a front surface 24, a rear surface 26, a first side edge 28, a second side edge 30, an upper edge 32 and a lower edge 34. The front surface 24 and the rear surface 26 extend between the first and second side edges 28 and 30. The front and rear surfaces 24 and 26 also extend between upper and lower edges 32 and 34.

The molded wall panel 22 may be formed from a polymer, illustratively a thermoplastic such as acrylonitrile butadiene styrene (ABS). In certain illustrative embodiments, the front surface 24 may be generally smooth or planar. In other illustrative embodiments, a plurality of linear indentations 36 may be formed in the front surface 24. In such embodiments, a plurality of raised portions 38, illustratively of a polygonal shape, are formed intermediate the linear indentations 36. The linear indentations 36 are configured to simulate grout lines, while the raised portions 38 are configured to simulate conventional ceramic tile.

The linear indentations 36 illustratively include a plurality of horizontal indentations 36a and a plurality of vertical indentations 36b. As such, the raised portions 38 are illustratively of a rectangular shape. In one illustrative embodiment, the raised portions 38 are squares, such as 4 inch×4 inch squares or 6 inch×6 inch squares to simulate conventional ceramic tile dimensions. The polymer of the wall panel 22 may also be capped with a patterned film (e.g., marble, etc.) to create a more realistic tile-like appearance.

In the illustrative embodiment, a recessed pocket 40 is formed within the wall panel 22. The recessed pocket 40 illustratively includes a rear wall 42, a bottom wall 44 and a top wall 46. The recessed pocket 40 illustratively has a depth (d) of approximately 0.38 inches to receive conventional ceramic tiles, such as a mosaic tile assembly 50. The tile assembly 50 illustratively includes individual ceramic tiles 52 of conventional size and shape, as further detailed herein. While ceramic tiles are illustratively used in the tile assembly 50, other materials may be substituted therefor, such as glass or stone.

The height (h) of the recessed pocket 40 may vary depending upon the size, shape and number of mosaic tiles 52 to be inserted within the pocket 40. In an illustrative embodiment, the height (h) of the recessed pocket 40 is between 3 inches and 6 inches. Illustratively, the pocket 40 has a height (h) of approximately 6 inches to facilitate insertion of conventional mosaic tile sheets (typically 12 inches by 12 inches). The mosaic tile sheets would illustratively be cut in half to a length of 12 inches and a height of 6 inches for insertion within the pocket 40.

Illustratively, the pocket 40 extends the full width of the wall panel 22 between the first and second side edges 28 and 30 (i.e., open ends). In alternative embodiments, the pocket 40 may not extend the full width of the wall panel 22 and terminate prior to one or both of the side edges 28 and 30 (i.e., closed end(s)).

Illustratively, the mosaic tiles 52 are supported on a flexible substrate, such as a mesh backing 54. The mesh backing 54 and tiles 52 are adhered to the rear wall 42 of the recessed pocket 40 through conventional means, such as an adhesive 56. Once in position, a finish grout 58, such as an acrylic, may be used to fill in the gaps between adjacent mosaic tiles 52. The tile assembly 50 may be provided with the wall panel 22 as a kit. Alternatively, the tile assembly 50 may be acquired separately by the installer to facilitate customization as desired by the end user.

Reinforcing ribs 60 may be supported by the rear surface 26 of the wall panel 22 to further support the wall panel 22 and provide additional rigidity. The ribs 60 may be spaced at various locations to align with mounting studs 20. In one illustrative embodiment, the ribs 60 may be integrally molded with the wall panel 22. Inserts 62, such as Styrofoam panels may be coupled to the rear surface 62 of the wall panel 22 for additional support through contact with wall studs 20. In one illustrative embodiment, the inserts 62 may be positioned intermediate the ribs 60.

In certain illustrative embodiments, inwardly extending pockets may be formed within the linear indentations 36 of the wall panel 22 to receive conventional grout (not shown). For example, the installer may fill the pockets with grout in a manner similar to conventional ceramic tile.

In other illustrative embodiments, simulated grout 64 may be formed within the front surface 66 of linear indentations 36 between adjacent raised portions 38 in the wall panel 22. More particularly, the linear indentations 36 may be surfaced treated in order to provide for the appearance of simulated grout 64. As further detailed herein, in one illustrative embodiment the surface 66 is treated through a laser etching process. In another illustrative embodiment, the surface 66 is treated through a sand blasting process. In yet another illustrative embodiment, a polymeric colored film may be applied to the surface 66 to define the simulated grout 64.

In the laser etching process, the surface 66 of linear indentations 36 are etched with a laser to turn the simulated grout 64 a different color. The settings of the laser (e.g., intensity, duration) may be modified or varied to obtain different colors of the simulated grout 64. For example, the simulated grout 64 may be gray, brown or black depending upon the laser settings. Additives may be added to the polymer of the wall panel 22 to cause the laser to change the simulated grout 64 to a variety of different colors, such as red, blue, etc. Additionally, the laser may be adjusted to create textures within the polymer of the wall panel 22. In other words, the surface 66 may be roughened by the laser in order to provide a grout-like texture.

In the sand blasting process, a sand or bead blast is utilized to create a grout pattern in the linear indentations 36 of the wall panel 22. Areas of the wall panel 22 that should not be affected (e.g., raised portions 38) may be masked with a fixture. The sand or beads etched/embed within the polymer of the indentations 36 and turn it to a different color. By changing the color of the sand, different grout colors may be provided (e.g., black, gray, brown, etc.). The size of the sand/bead grains may also be adjusted to create different textures.

Figure 4A:
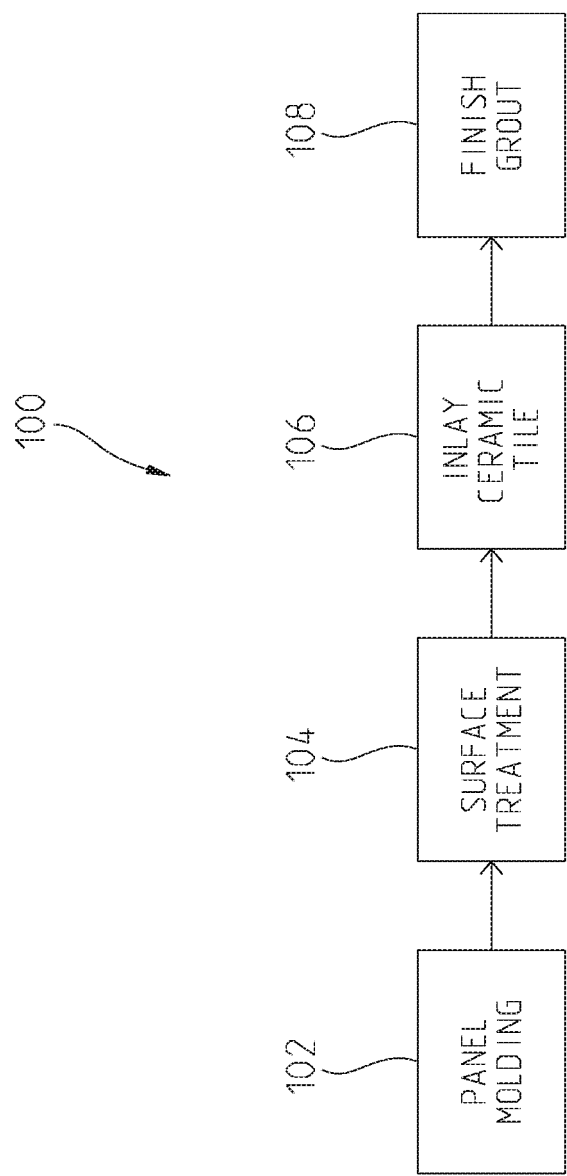
FIG. 4A is a flow chart of an illustrative method of manufacturing the wall unit of FIG. 2.
Figure 4B:
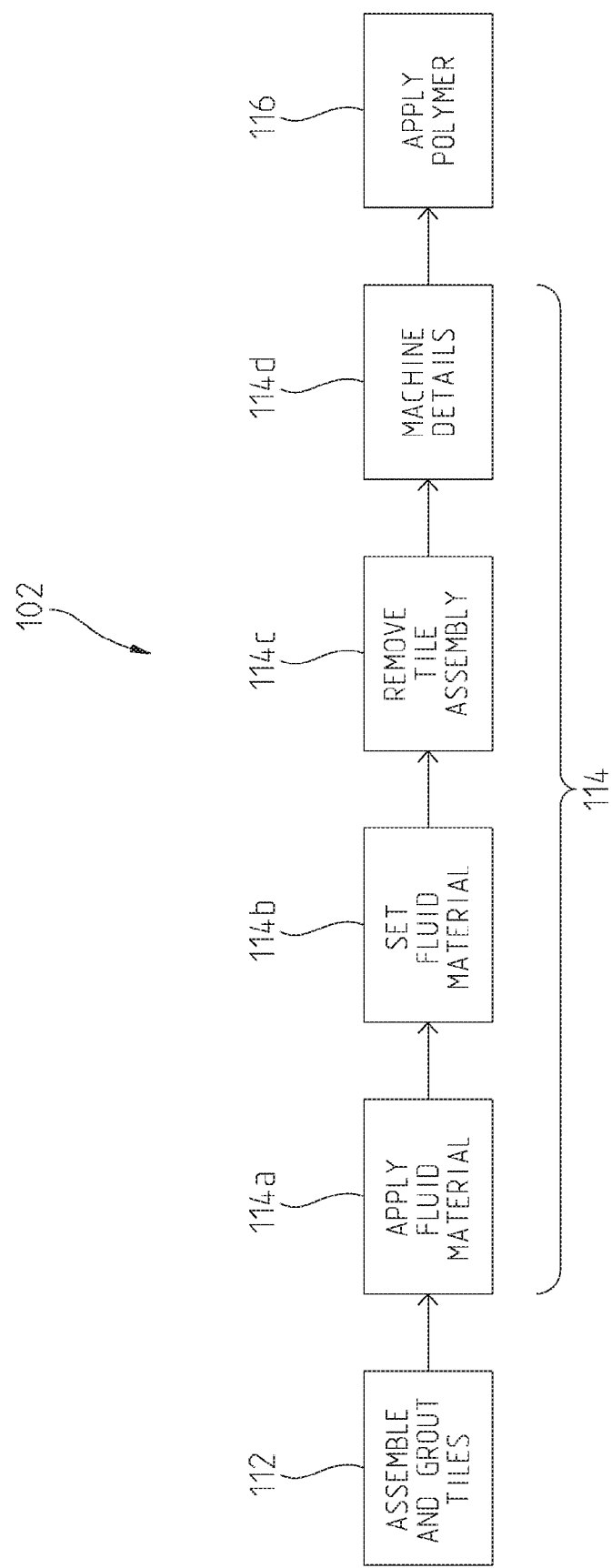
FIG. 4B is a flow chart of an illustrative casting method of FIG. 4A.
Figure 5:
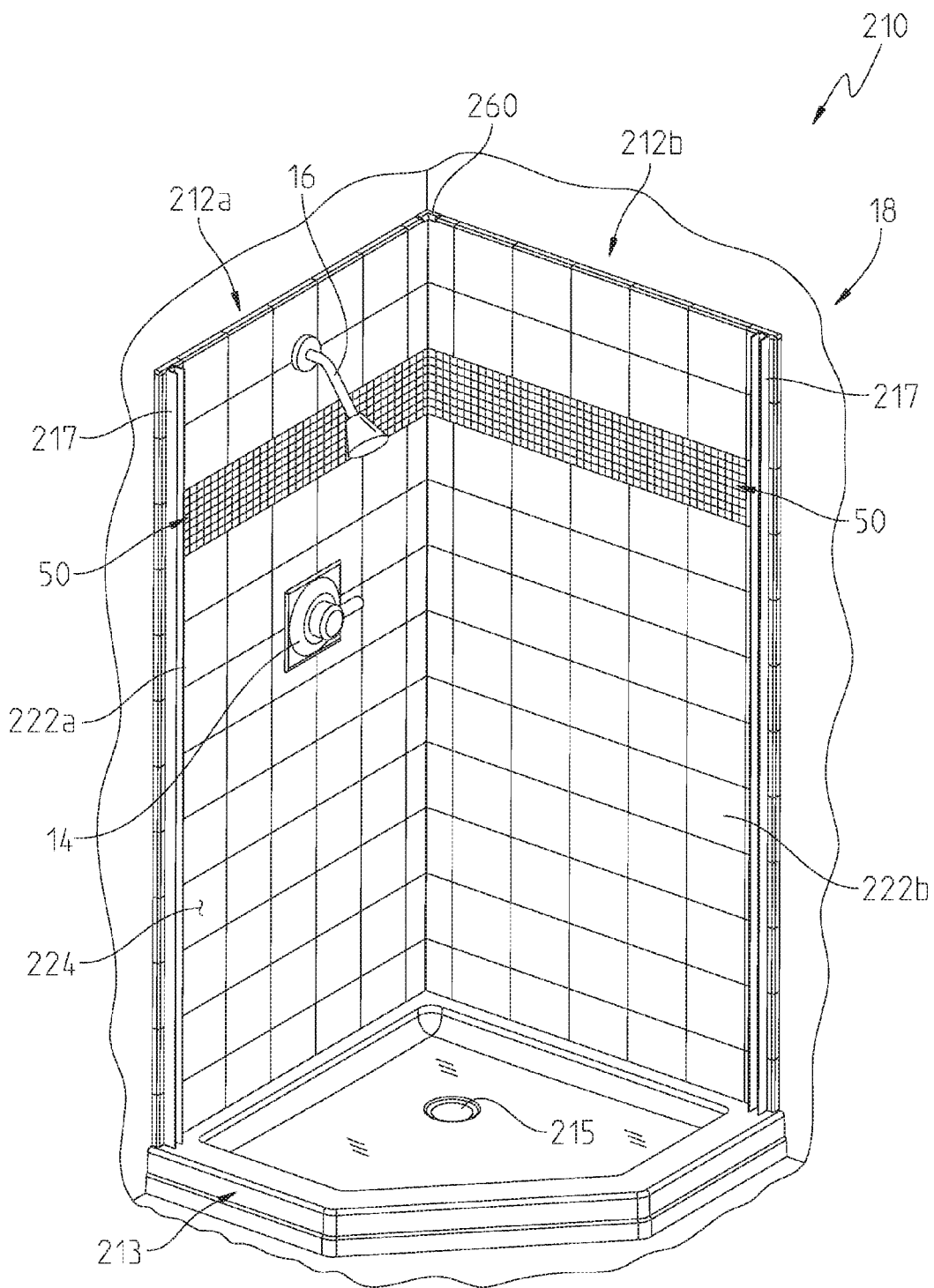
FIG. 5 is a perspective view of a further illustrative shower enclosure including wall units of the present disclosure.
Figure 6:
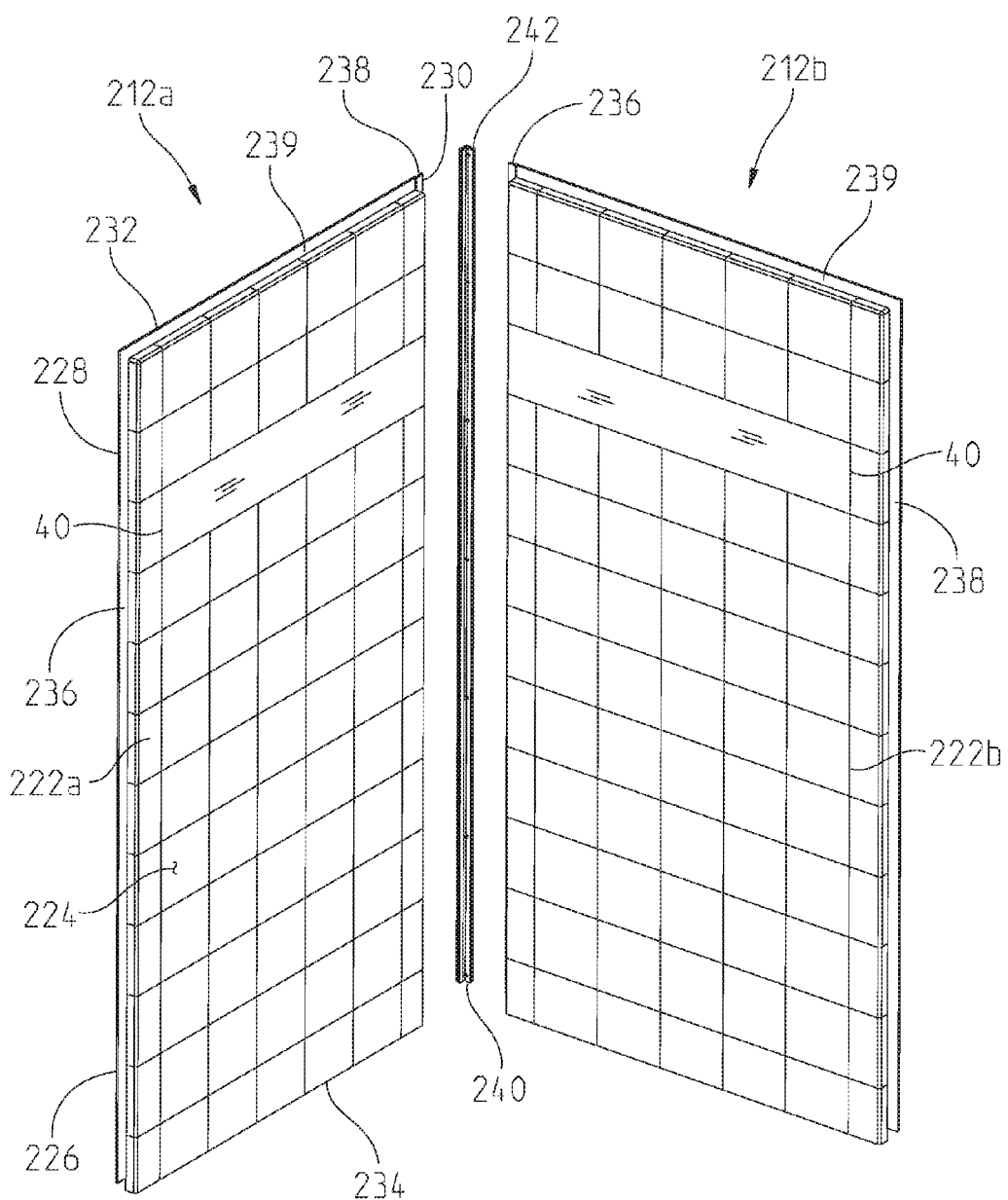
FIG. 6 is an exploded perspective view of the shower enclosure of FIG. 5.
Figure 7:
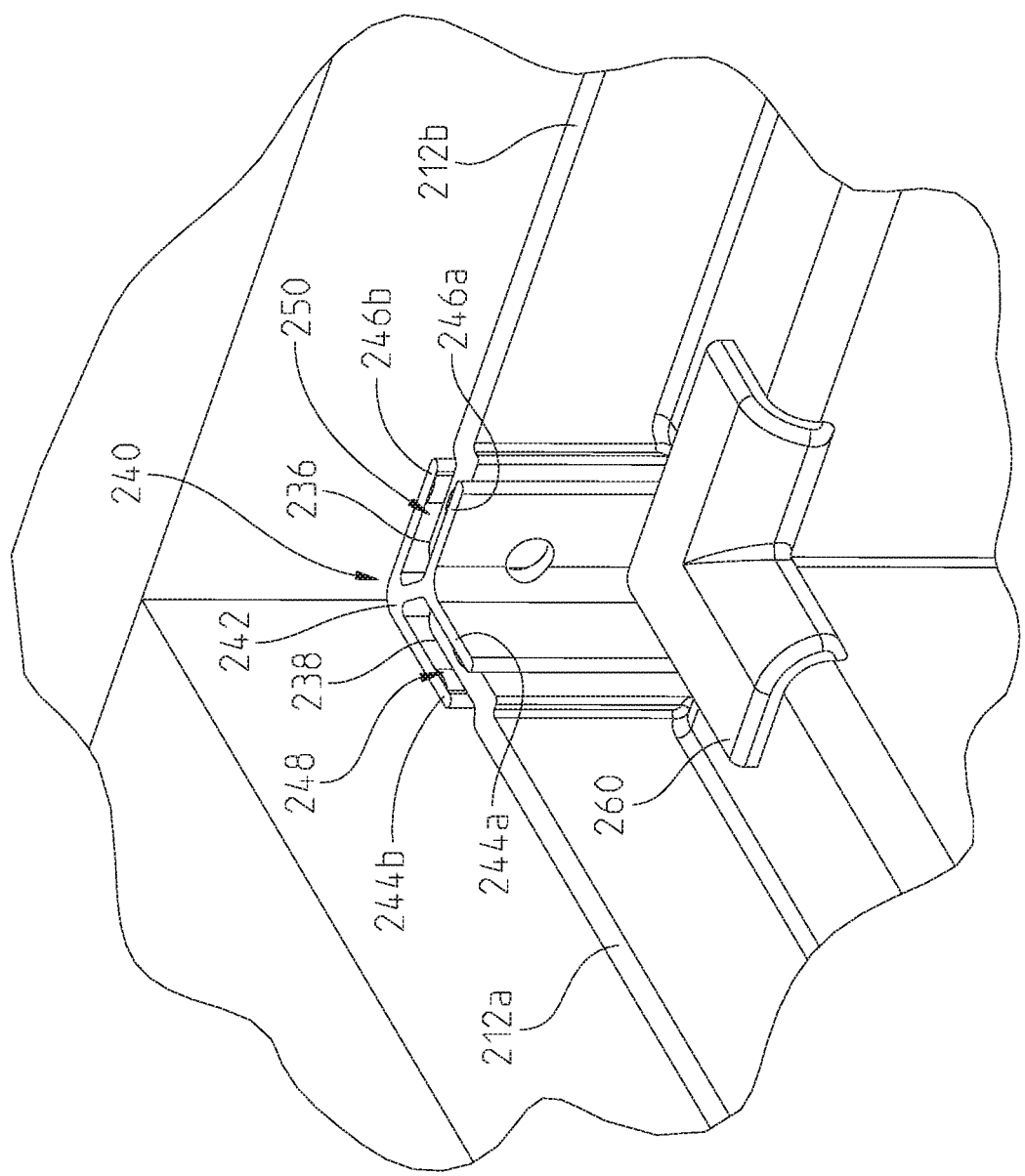
FIG. 7 is a perspective view of the top corner between the wall units of FIG. 5.
Figure 8:
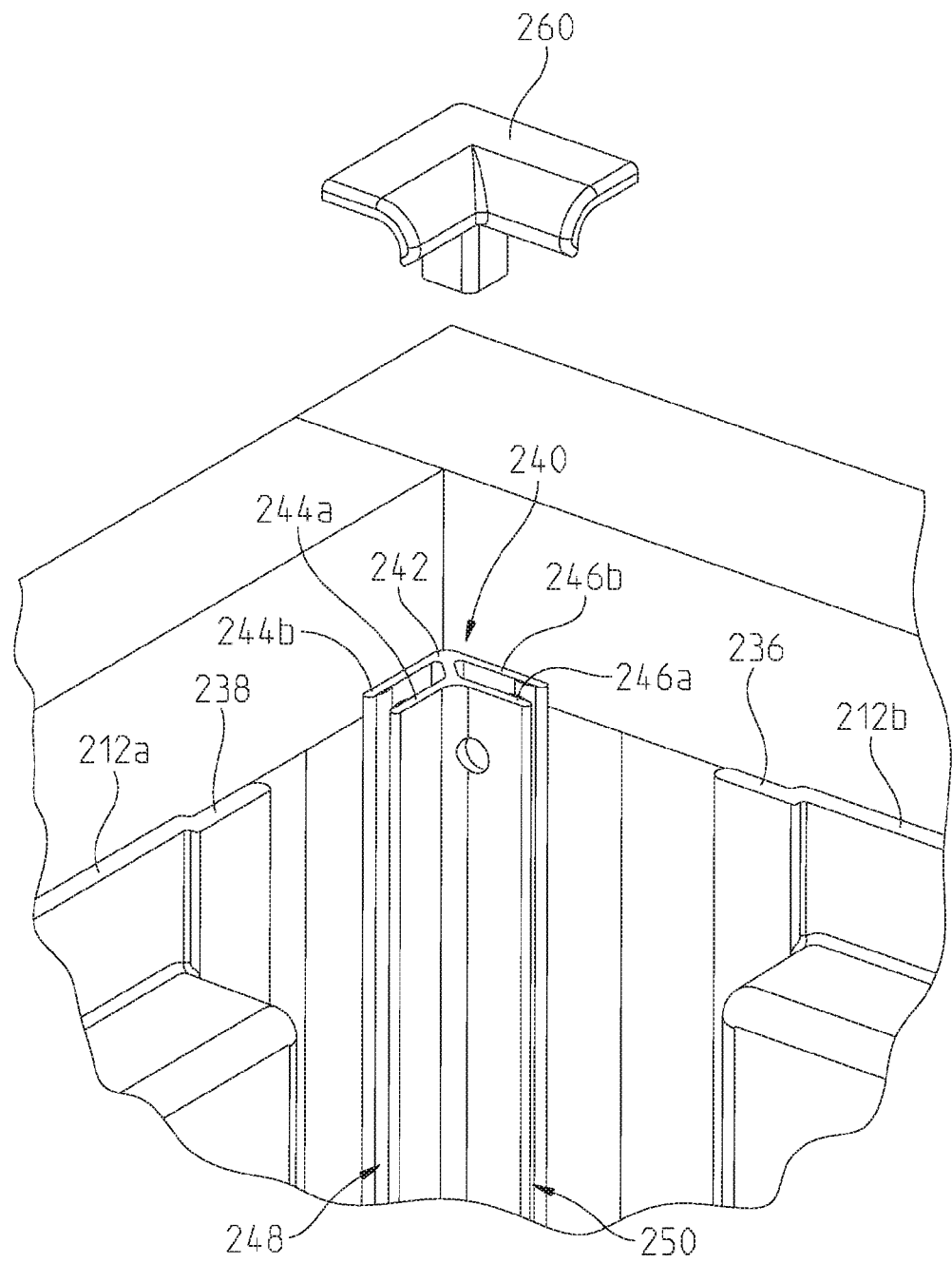
FIG. 8 is an exploded perspective view of the top corner of FIG. 7.
Figure 9:
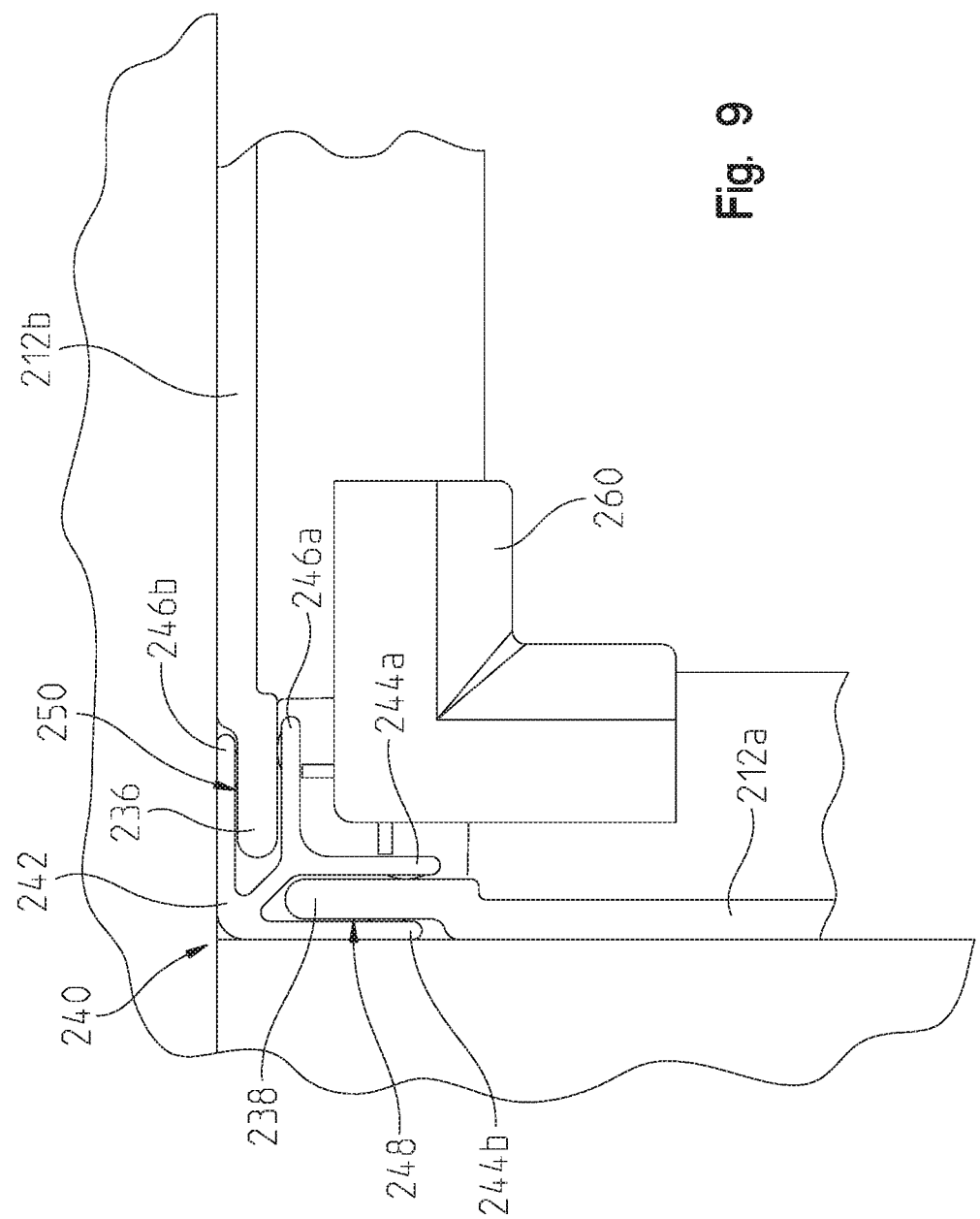
FIG. 9 is a top plan view of the top corner of FIG. 7.
Figure 10:
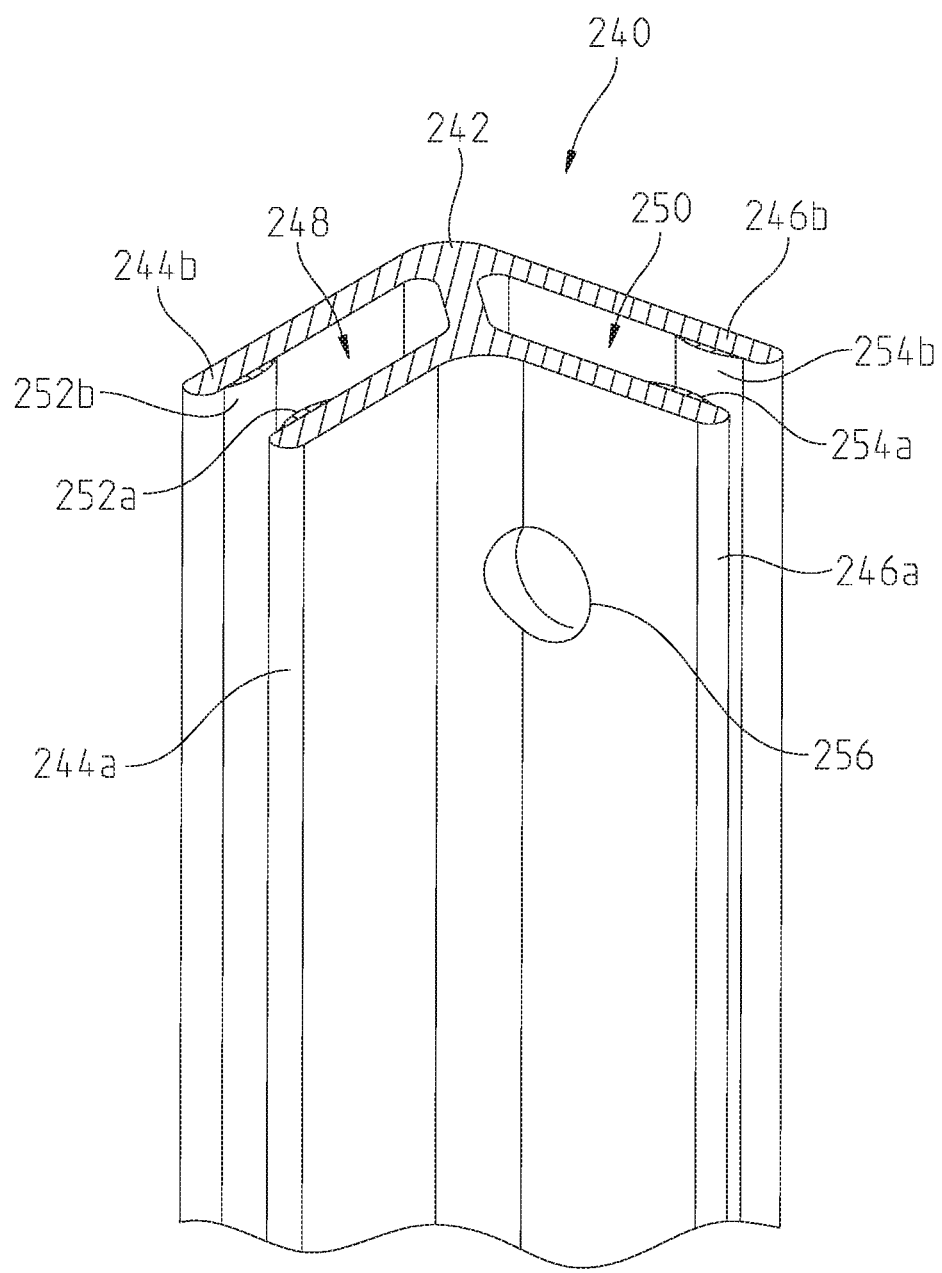
FIG. 10 is a perspective view, in partial cross-section, of the upper end of the corner bracket of FIG. 7.

With reference to FIGS. 1, 4A and 4B, in an illustrative method of manufacturing 100, the wall panel 22 is formed at block 102, illustratively through applying a thermoplastic, such as ABS, within a mold. The wall panel 22 is molded to define the linear indentations 36 and raised portions 38, along with the recessed pocket 40. In one illustrative embodiment, the wall panel 22 may be molded through a thermoforming process.

With reference to the illustrative panel molding process of FIG. 4B, the mold for forming the wall panel 22 may be formed by using a traditional ceramic tile assembly or wall as a pattern or template. More particularly, at block 112 a ceramic tile assembly or wall is illustratively formed by setting and grouting individual ceramic tiles on a horizontal support surface. A mold is illustratively cast at step 114. More particularly, a fluid material, such as a resin, urethane, aluminum, etc. is cast over the finished ceramic tile assembly at block 114*a*. The fluid material then sets or hardens at block 114*b*. The ceramic tile assembly is removed from the set or hardened material at block 114*c*. The resulting "negative" impression defined by the set material defines a mold used for forming the wall panel 22. Any additional desired details (e.g., recessed pocket 40) may be created within the mold, illustratively through machining, at block 114*d*.

In an illustrative thermoforming process at block 116, the wall panel 22 is formed from polymer applied to the mold to capture the shape, form and texture (including surface irregularities and/or cavities) of the ceramic tile assembly. The result is a formed wall panel 22 that looks like the original pattern with all of the irregularities or imperfections of the ceramic tile assembly, including the tiles, grout and the human interaction in laying the tile.

At block 104 of FIG. 4A, surface treatment is applied to the front surface 66 of linear indentations 64 to define simulated grout 64. Such surface treatment may be sand blasting and/or laser etching, as further detailed herein.

At block 106 of FIG. 4A, adhesive 56 is applied to the rear wall 42 of the recessed pocket 40 and the tile assembly 50 is secured to the rear wall 42. At block 108, finish grout 58, such as acrylic, may be applied to the tile assembly 50 after it has set to the rear wall 42.

The rear surface of the wall panel 22 illustratively includes mounting members, such as the ribs 60, to bring the panel 22 equal to the wall studs 20 for direct mounting to the studs 20. A hole may be drilled through the rear wall 42 of the recessed pocket 40 at the center of the stud 20. The wall panel 22 is then secured to the stud 20 to provide additional rigidity to the recessed pocket 40. A silicone is illustratively applied to seal the opening. Conventional mounting flanges proximate upper and lower edges 32 and 34 may receive fasteners to secure the wall panel 22 to wall studs 20.

With further reference to FIGS. 5-10, a further illustrative shower enclosure 210 is shown as including many similar components as the shower enclosure 10 detailed above. As such, similar components will be identified with like reference numbers. The illustrative shower enclosure 210 includes bathroom wall units 212*a*, 212*b* illustratively supported by wall 18 above a base 213 having a drain 215. Translucent shower partitions (not shown) may be supported above the base 213. Mounting channels 217 may receive edges of the shower partitions.

Each wall unit 212 includes a molded wall panel 222 including a front surface 224, a rear surface 226, a first side edge 228, a second side edge 230, an upper edge 232 and a lower edge 234. The front surface 224 and the rear surface 226 extend between the first and second side edges 228 and 230 and the upper and lower edges 232 and 234. A first mounting flange 236 is supported by the first side edge 228, and a second mounting flange 238 is supported by the second side edge 230. Similarly, a third or upper mounting flange 239 is supported by the upper edge 232. The first mounting flange 236, the second mounting flange 238 and the upper mounting flange 239 are recessed from the front surface 224 of each wall panel 222.

First and second wall panels 222*a* and 222*b* may be coupled together through a connecting bracket 240. Illustratively, the connecting bracket 240 includes a body 242 having a first pair of arms 244 and a second pair of arms 246. The first pair of arms 244 includes a first inner arm 244*a* and a second outer arm 244*b* defining a first recess 248, while the second pair of arms 246 includes a second inner arm 246*a* and a second outer arm 246*b* defining a second recess 250. The first mounting flange 236 of the second wall panel 222*b* is received within the second recess 250, while the second mounting flange 238 of the first wall panel 222*a* is received within the first recess 248.

Illustratively, at least one seal 252 is supported by the connecting bracket 240. For example, at least one seal 252 may be supported by the first pair of arms 244, and at least one seal 254 may be supported by the second pair of arms 246. A first inner seal 252*a* is illustratively supported by the first inner arm 244*a*, and a first outer seal 252*b* is illustratively supported by the first outer arm 244*b*. Similarly, a second inner seal 254*a* may be supported by the cond inner arm 246*a*, and a second outer seal 254*b* may be supported by the second outer arm 246*b*. As further detailed herein, the outer seals 252*b* and 254*b* may be eliminated. Furthermore, the outer arms 244*b* and 246*b* may be eliminated, wherein the inner arms 244*a* and 246*a* trap the respective mounting flanges 238 and 236 of the wall panels 222*a* and 222*b* against the wall stud 20.

Illustratively, the body 242 of the connecting bracket 240 is formed of a first material, illustratively a polymer such as a polypropylene. The seals 252 and 254 are illustratively formed of a second material, such as an elastomer or thermoplastic vulcanizate (Santoprene™ TPV). The second material is softer than the first material, such that the seals 252 and 254 frictionally engage and provide effective fluid seals between the mounting flanges 236 and 238 and the body 242 of the connecting bracket 240, while the body 242 of the connecting bracket 240 provides adequate support to the wall panels 222. Illustratively, the first material (e.g., polypropylene) has a hardness or durometer of approximately 75 shore D, while the second material (e.g., TPV) has a hardness or durometer of approximately 50 shore A. Illustratively, the body 242 of the connecting bracket 240 is co-extruded with the seals 252 and 254 to form a dual extrusion. More particularly, the polypropylene of the body 242 and the TPV of the seals 252 and 254 bond together during the extrusion process.

While the illustrative embodiment details co-extruded body 242 and seals 252, 254, it should be noted that the body 242 may be formed separately from the seals 252, 254. For example, the body 242 may be molded from a polymer or extruded from aluminum with a pocket to receive separately extruded seals 252, 254. The seals 252, 254 could then be pressed into (or otherwise secured within) the pockets of the body 242.

In one illustrative embodiment, the first arms 244 extend substantially perpendicular to the second arms 246, thereby defining a corner bracket 240. A plurality of openings 256 are illustratively formed within the body 242 to receive fasteners (not shown) for securing the bracket 240 to the wall 18. The bracket 240 illustratively extends longitudinally along the full height of the wall panel 222.

An upper trim or cap 260 may be secured to the upper end of the wall panels 212*a* and 212*b*, illustratively through a conventional adhesive. In certain illustrative embodiments, molded cooperating portions of the panels 222 may replace the cap 260.

In certain illustrative embodiments, an outer corner trim (not shown) may cover the exposed interface or corner joint between the wall panels 222 and extends longitudinally parallel to the corner bracket 240. Alternatively, the corner joint may be sealed with a conventional sealant or caulk.

Figure 11:
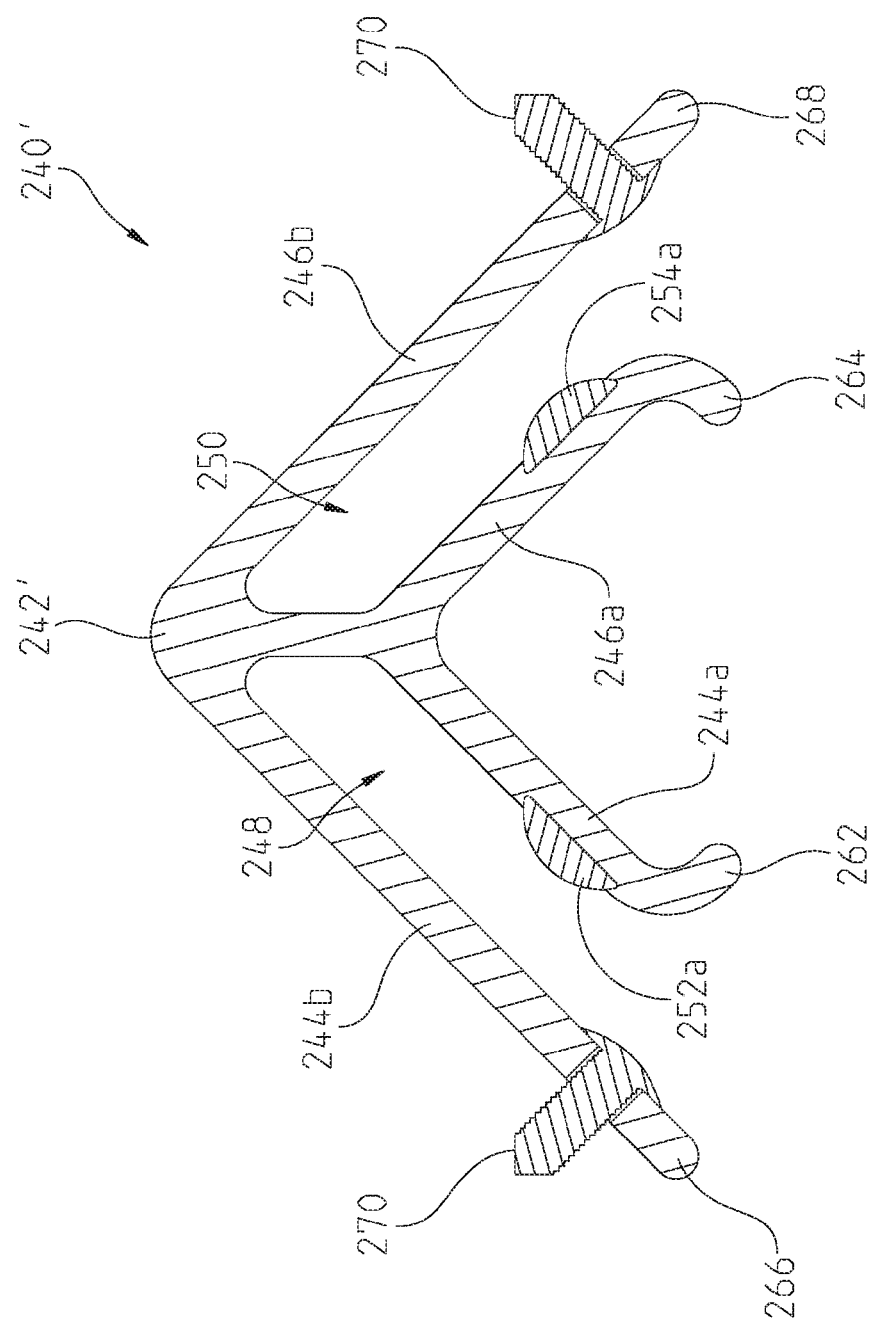
FIG. 11 is a top plan view of a further illustrative corner bracket for use with the shower enclosure of FIG. 5.

A further illustrative corner bracket 240' is shown in FIG. 11 as including many similar features of corner bracket 240 detailed above. The corner bracket 240' includes only inner seals 252a and 254a supported by the inner arms 244a and 246a, respectively. The inner arms 244a and 246a include entrant edges 262 and 264, illustratively curved portions, configured to assist in guiding the mounting flanges 238 and 236 of the wall panels 222a and 222b into the recesses 248 and 250. Additionally, the outer arms 244b and 246b include outer portions 266 and 268 extending beyond the entrant edges 262 and 264 of the inner arms 244a and 246a, and are configured to receive fasteners, such as screws 270 to secure to studs in the wall 18.

Installation of the shower enclosure illustratively begins by placing the base 213 within the rough-in corner defined by the wall 18. The base 213 is secured to the wall 18 in a conventional manner.

In one illustrative method of installation, the corner bracket 240, 240' is next secured to the wall 18, illustratively through an adhesive and/or screws 270. The first wall panel 222a is secured to the bracket 240, 240', illustratively by lubricating the mounting flange 238 with soap or lubricant and then sliding the flange 238 into the recess 248 of the bracket 240, 240'. The wall panel 222a is then secured to the wall 18 by fasteners, such as screws 270 inserted through upper and side mounting flanges 239 and 236. Next, the mounting flange 236 of the second wall panel 222b is inserted within the recess 250 of the bracket 240, 240'. This process is repeated for additional wall panels 222. Sealant or caulk is then illustratively applied along the corner and bottom joints.

In another illustrative method of installation, a user slides the corner bracket 240, 240' onto the first wall panel 222a and then secures the assembly to the wall 18. More particularly, the flange 238 is slid into the recess 248 of the bracket 240, 240'. Adhesive is applied to the desired wall stud 20, and the wall panel 222a and bracket 240, 240' are pushed into the rough-in corner. The wall panel 222a and bracket 240, 240' are then secured to the wall stud 20 illustratively through screws 270. Holes may be drilled through the wall panel 222a and bracket 240, 240' to facilitate insertion of the screws 270. Next, the mounting flange 236 of the second wall panel 222b is inserted within the recess 250 of the bracket 240, 240'. This process is repeated for additional wall panels 222. The wall panels 222a and 222b are then secured to the wall 18 by fasteners, such as screws 270 inserted through upper and outer side mounting flanges 239 and 236, 238. Sealant or caulk is then illustratively applied along the corner and bottom joints.

Figure 12:
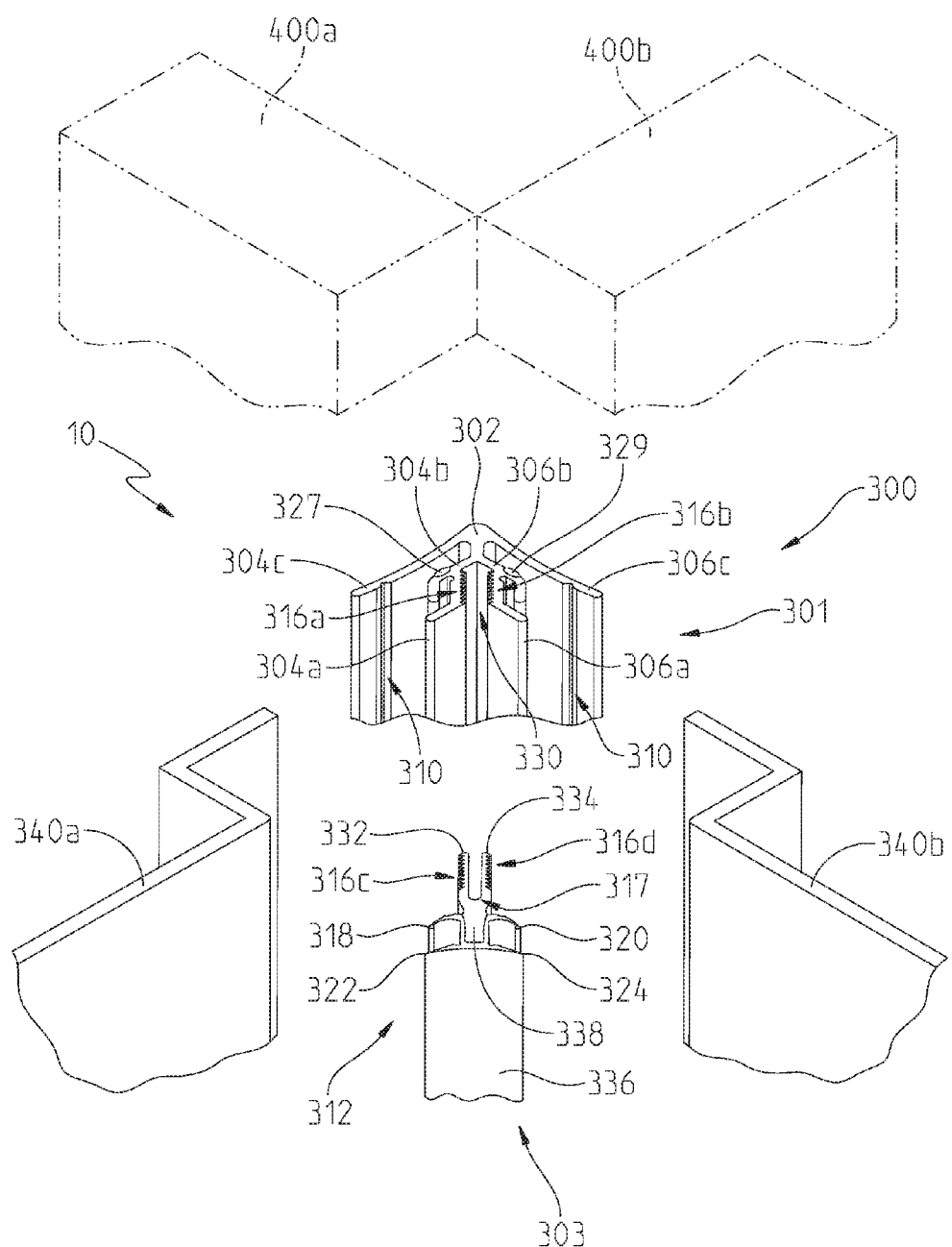
FIG. 12 is an exploded perspective view of a further illustrative corner bracket for use with a shower enclosure.
Figure 13:
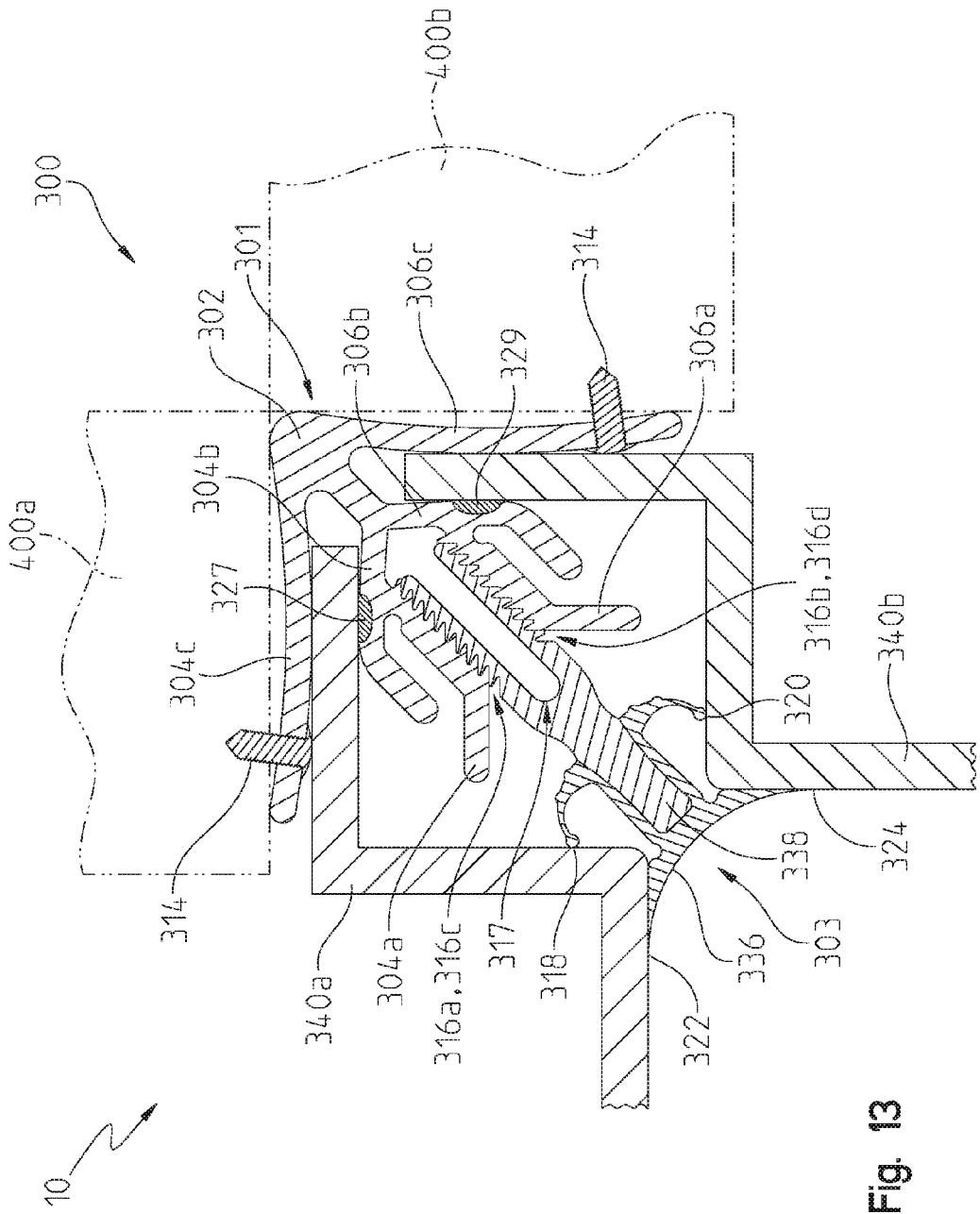
FIG. 13 is a cross-sectional view of the corner bracket of FIG. 12 as used in a shower enclosure.
Figure 14:
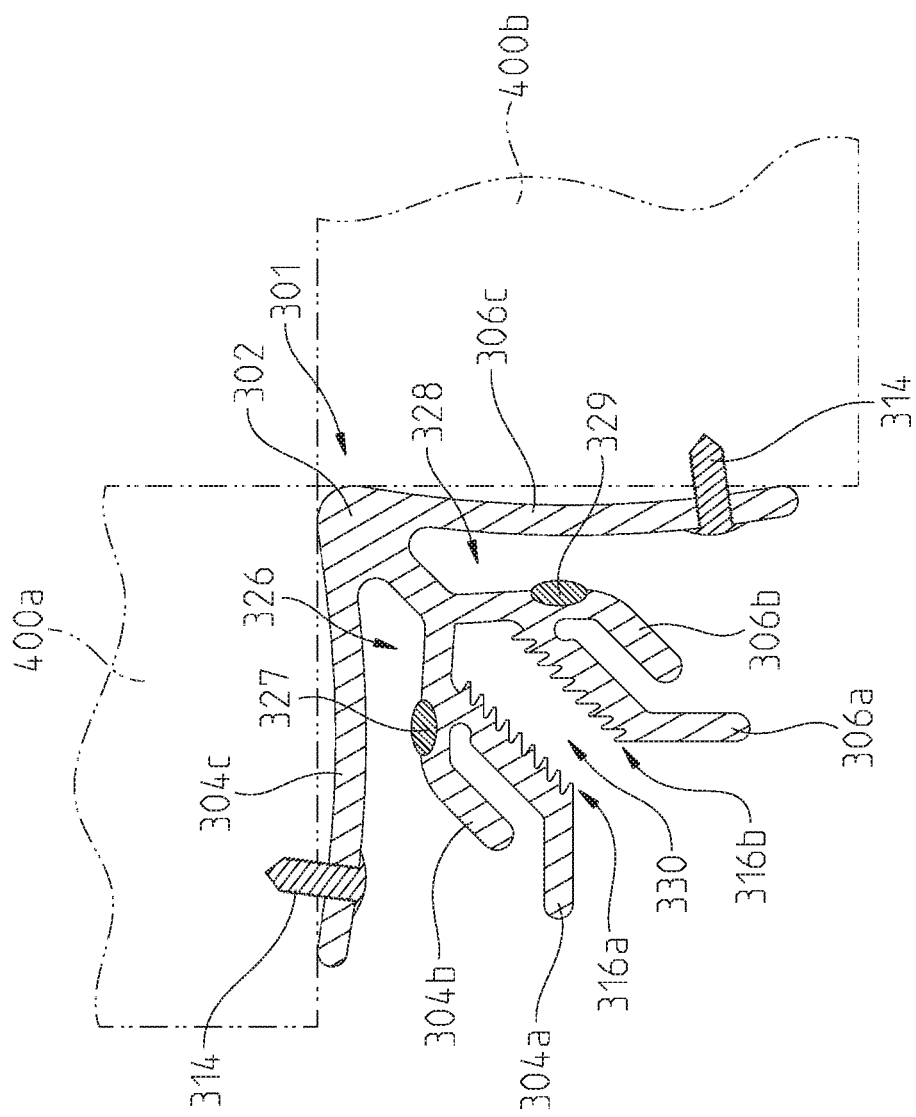
FIG. 14 is a cross-sectional view of the outer receiver of the corner bracket of FIG. 12 as used in a shower enclosure.

Referring now to FIGS. 12-14, another embodiment of an illustrative corner bracket 300 is shown within a shower enclosure 10. Corner bracket 300 illustratively includes an outer receiver 301 and an insert 303. The illustrative outer receiver 301 includes an outer receiver body 302 having a first trio of arms 304a-304c and second trio of arms 306a-306c. First outer arm 304c and first middle arm 304b define a first outer recess 326 (FIG. 14). Similarly, second outer arm 306c and second middle arm 306b define a second outer recess 328 (FIG. 14). The first middle arm 304b is angled away from the first outer arm 304c to define a lead-in or enlarged opening for the first outer recess 326, and the second middle arm 306b is angled away from the second outer arm 306c to define a lead-in or enlarged opening for the second outer recess 328.

First inner arm 304a and second inner arm 306a extend inwardly from first middle arm 304b and second middle arm 306b, respectively. First inner arm 304a and second inner arm 306a define a center recess 330. The inner arms 304a and 306a angle outwardly at open end of center recess 330 to define a lead-in or enlarged channel to assist in receiving the insert 303. The first inner arm 304a, the first middle arm 304b, and the first outer arm 304c are configured to move or flex independently from each other. Similarly, the second inner arm 306a, the second middle arm 306b, and the second outer arm 306c are configured to move or flex independently from each other.

First middle arm 304b and second middle arm 306b have seals 327, 329 attached thereto respectively. Illustratively, body 302 of outer receiver 301 is formed of a first material, illustratively a polymer such as a polypropylene. Seals 327 and 329 are illustratively formed of a second material, such as an elastomer or thermoplastic vulcanizate (Santoprene™ TPV). The second material is softer than the first material, such that the seals 327 and 329 frictionally engage and provide effective fluid seals between wall panels 340a, 340b and body 302 of outer receiver 301, while body 302 of outer receiver 301 provides adequate support to the wall panels 340a, 340b. Illustratively, the first material (e.g., polypropylene) has a hardness or durometer of approximately 75 shore D, while the second material (e.g., TPV) has a hardness or durometer of approximately 50 shore A. Illustratively, body 302 of outer receiver 301 is co-extruded with seals 327 and 329 to form a dual extrusion. More particularly, the polypropylene of body 302 and the TPV of seals 327 and 329 bond together during the extrusion process.

While the illustrative embodiment details co-extruded body 302 and seals 327, 329, it should be noted that body 302 may be formed separately from the seals 327, 329. For example, body 302 may be molded from a polymer or extruded from aluminum with a pocket to receive separately extruded seals 327, 329. The seals 327, 329 could then be pressed into (or otherwise secured within) the pockets of the body 302.

Figure 16:
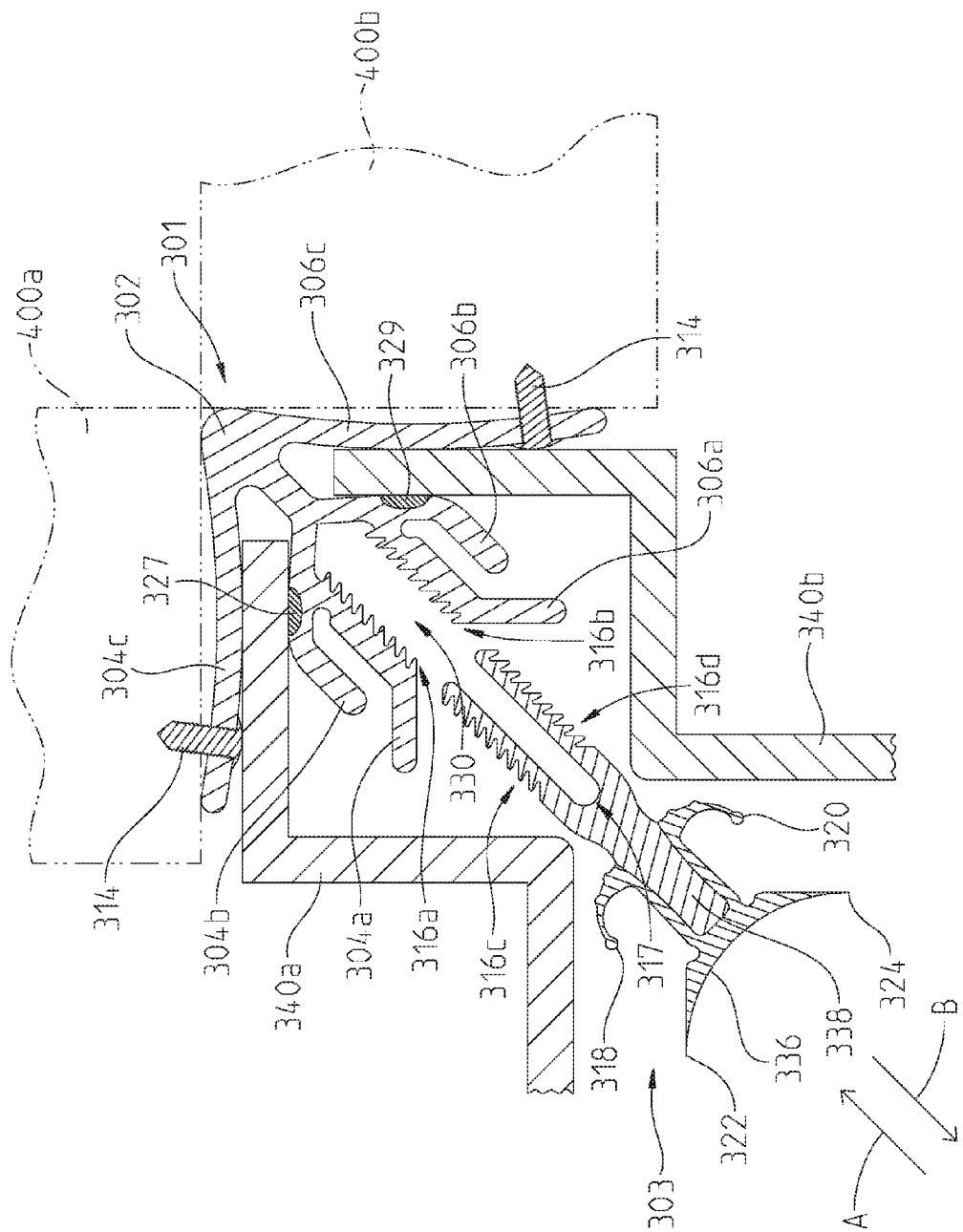
FIG. 16 is a cross-sectional view of an inner sealing body being inserted into the outer receiver of the corner bracket of FIG. 12 in a shower enclosure.

Illustrative corner bracket 300 also includes an inner sealing body 312 that is coupled to body 302. More particularly, a locking device 317 is supported by the outer receiver body 302 and the inner sealing body 312, and is configured to secure the inner sealing body 312 to the outer receiver body 302. Extending into recess 330 are a plurality of raised projections 316a (FIG. 14) extending inwardly from first inner arm 304a and a plurality of raised projections 316b extending inwardly from second inner arm 306a. The plurality of raised projections 316a, 316b of the outer receiver body 302 serve to frictionally engage with a corresponding plurality of raised projections 316c, 316d of the inner sealing body 312 and define locking device 317, as further described below. In one illustrative embodiment, the plurality of raised projections 316 includes a plurality of ridges, teeth, or barbs that are angled along an axis defined by direction A (FIG. 16). In an alternative embodiment, the plurality of raised projections 316 are perpendicular with respect to the outer surfaces of first and second inner arms 304a, 306a.

Inner sealing body 312 illustratively includes a first body 336 and a second body 338. Second body 338 of inner sealing body 312 is formed of a first material, illustratively a polymer such as a polypropylene. First body 336 is illustratively formed of a second material, such as an elastomer or thermoplastic vulcanizate (Santoprene™ TPV). The second material is softer than the first material, such that first outer portion 318, second outer portion 320, third outer portion 322, and fourth outer portion 324 of first body 336 frictionally engage and provide effective fluid seals with wall panels 340a, 340b, while locking device 317 of second body 338 of inner sealing body 312 frictionally engages with first and second inner arm 304a, 306a of body 302 as described in further detail below. Illustratively, the first material (e.g., polypropylene) has a hardness or durometer of approximately 75 shore D, while the second material (e.g., TPV) has a hardness or durometer of approximately 50 shore A. Illustratively, first body 336 of inner sealing body 312 is co-extruded with second body 338 to form a dual extrusion. More particularly, the polypropylene of second body 338 and the TPV of first body 336 bond together during the extrusion process.

While the illustrative embodiment details co-extruded first body 336 and second body 338, it should be noted that first body 336 may be formed separately from second body 338. For example, second body 338 may be molded from a polymer or extruded from aluminum with a protrusion to be inserted into a pocket of separately extruded first body 336. Second body 338 could then be pressed into a pocket of first body 336.

First body 336 includes a first outer portion 318, a second outer portion 320, a third outer portion 322, and a fourth outer portion 324. Outer portions 318, 320, 322, 324 are configured to sealingly engage with wall panels 340a, 340b as described in further detail below.

Second body 338 of inner sealing body 312 includes spaced apart first arm 332 and second arm 334, which are configured to flex independently relative to each other as they are received within the recess 330. Plurality of raised projections 316c, 316d are supported on the respective outer surfaces of first arm 332 and second arm 334. Plurality of raised projections 316c, 316d of locking device 317 extend outwardly from the outer surfaces of arms 332 and 334 and correspond to the plurality of raised projections 316a, 316b of first inner arm 304a and second inner arm 306a as locking device 317 is moved axially along direction A. In an illustrative embodiment, plurality of raised projections 316c, 316d comprise a plurality of ridges, teeth, or barbs that are angled along an axis defined by direction A and form opposing angles with the corresponding plurality of raised projections 316a, 316b. In an alternative embodiment, the plurality of raised projections 316c, 316d are perpendicular with respect to the outer surfaces of first arm 332 and second arm 334 of locking device 317.

Figure 15:
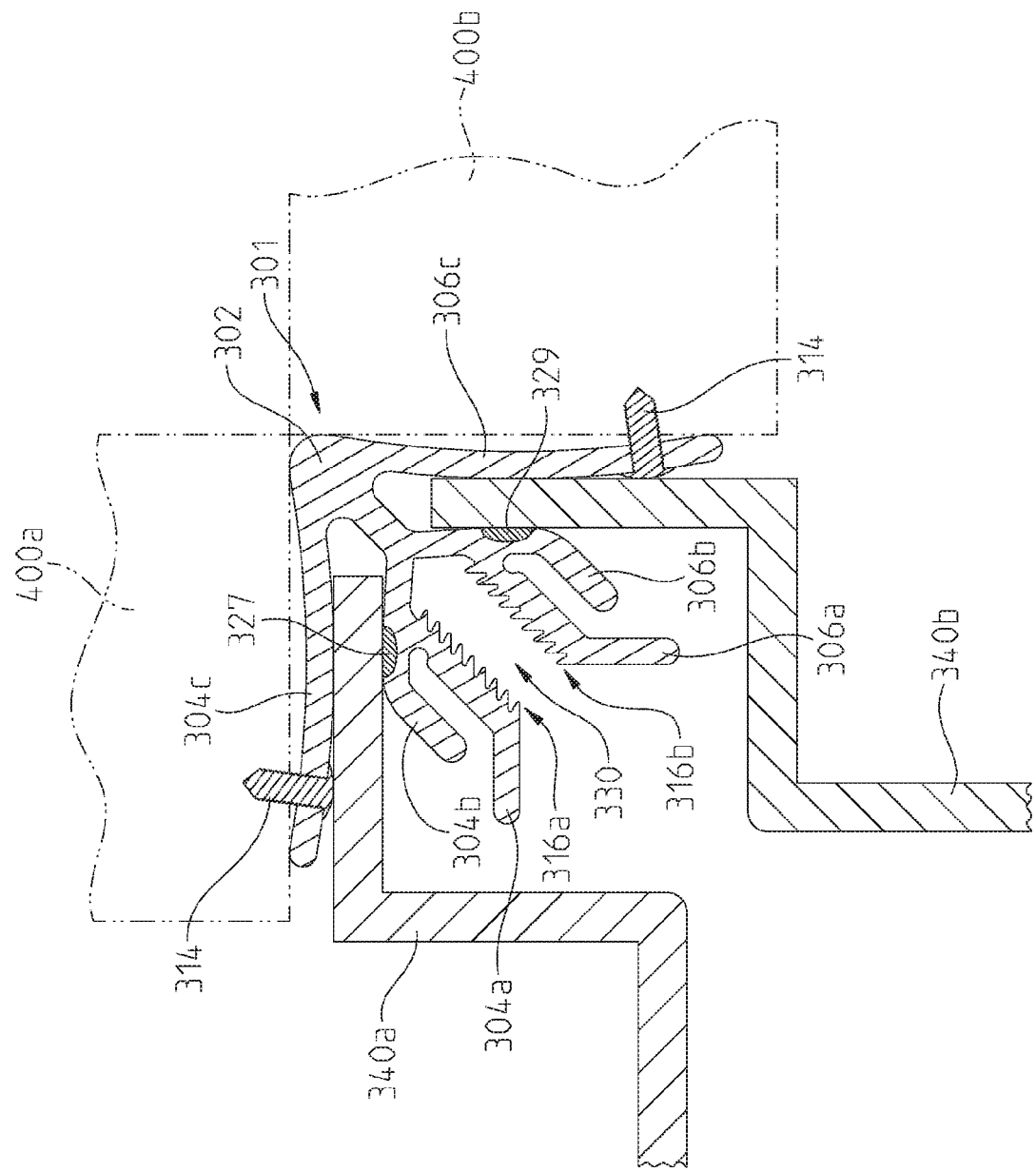
FIG. 15 is a cross-sectional view of the outer receiver of a corner bracket of FIG. 14 with mounted wall panels coupled thereto.

Assembly of the molded wall unit including corner bracket 300 is shown in FIGS. 14-16. As shown in FIG. 14, first outer arm 304c and second outer arm 306c of outer receiver 301 are mounted to a pair of mounting studs 400a, 400b by a pair of fasteners 314, such as screws. In an alternative embodiment, fasteners 314 may also include bolts, nails, and the like. Fasteners 314 are inserted through recessed pockets 310 along first outer arm 304c and second outer arm 306c. Recessed pockets 310 facilitate easy insertion of fasteners 314, and fasteners 314 ensure that corner bracket 300 does not move when corner bracket 300 is mounted to mounting studs 400a, 400b. In this configuration, recess 326 is substantially parallel with mounting stud 400a, and recess 328 is substantially parallel with mounting stud 400b.

As shown in FIG. 15, once first outer arm 304c and second outer arm 306c of body 302 are mounted to mounting studs 400a, 400b, wall panels 340a, 340b are coupled to body 302. Wall panel 340a is received within recess 326 (FIG. 14). As an end of wall panel 340a is inserted into recess 326, seal 327 resiliently deforms and allows wall panel 340a to enter into recess 326. Once wall panel 340a is inserted into recess 326, seal 327 applies an outward force onto wall panel 340a thereby cooperating with first outer arm 304c to frictionally engage with wall panel 340a and hold wall panel 340a in place. The interaction between seal 327 and wall panel 340a also provides a fluid tight seal at the interface of the two surfaces. Similarly, second wall panel 340b is inserted into recess 328. As wall panel 340b is inserted, seal 329 resiliently deforms to allow wall panel 340b to enter into recess 328. Once wall panel 340b is inserted, seal 329 applies a force onto wall panel 340b and cooperates with second outer arm 306c to hold wall panel 340b in place. Seal 329 also frictionally engages with wall panel 340b to provide a fluid tight seal at the interfaces of the two surfaces.

As shown in FIG. 16, once wall panels 340a, 340b are inserted into recesses 326, 328, locking device 317 of inner sealing body 312 is moved along direction A to be inserted into recess 330. As locking device 317 moves along direction A, first arm 332 and second arm 334 are substantially aligned with a portion of first inner arm 304a and second inner arm 306a. Specifically, the plurality of raised projections 316c, 316d along arms 332, 334 are substantially aligned with the plurality of raised projections 316a, 316b along first inner arm 304a and second inner arm 306a. Insertion of the second body 338 of inner sealing body 312 within the recess 330 is configured to spread the inner arms 304b and 306b, thereby causing the seals 327 and 329 to make improved sealing contact the wall panels 340a and 340b.

Also, first outer portion 318 and second outer portion 320 of first body 336 resiliently deform and move inwardly toward first body 336 as they engage with respective portions of wall panels 340a, 340b. As first and second outer portions 318, 320 move inwardly towards first body 336, inner sealing body 312 becomes temporarily thinner (by arms 332 and 334 flexing inwardly) thereby allowing inner sealing body 312 to continue to advance towards recess 330 along direction A.

As inner sealing body 312 continues to move along direction A, plurality of raised projections 316c, 316d of locking device 317 frictionally engage with plurality of raised projections 316a, 316b of body 302. Inner sealing body 312 is continuously advanced into recess 330 until substantially all of the plurality of raised projections 316c, 316d are frictionally engaged with substantially all of the plurality of raised projections 316a, 316b of first and second inner arms 304a, 306a. The frictional engagement of 316a-316d operates to prevent axial movement of inner sealing body 312 in a direction B, which is defined as the direction opposite of direction A.

In the illustrative embodiment, frictional engagement of the plurality of raised projections 316a-316d takes place in the form of a ratcheting mechanism where a first raised projection on both of the plurality of raised projections 316c, 316d frictionally engages with a first raised projection on both of the plurality of raised projections 316a, 316b within recess 330 so as to permit movement of inner sealing body 312 along direction A while preventing movement of inner sealing body 312 along direction B (FIG. 16). As additional force is applied onto inner sealing body 312 to further its advancement along direction A, first raised projection of the plurality of raised projections 316c, 316d will disengage from first raised projections of the plurality of raised projections 316a, 316b, and the first raised projections of 316c, 316d will continue to move along direction A.

The first raised projections of 316c, 316d will then frictionally engage and subsequently disengage with a second raised projection of the plurality of raised projections 316a, 316b. This frictional engagement and subsequent disengagement between the raised projections of 316c, 316d and the raised projections of 316a, 316b will sequentially continue until first raised projections of the plurality of raised projections 316c, 316d reaches the final raised projection of the plurality of raised projections 316a, 316b. In an alternate embodiment, the final raised projections of 316a, 316b are substantially thicker than the other raised projections of 316a, b to prevent subsequent disengagement by the first raised projection of 316c, 316d and continual axial movement along direction A. At this point, substantially all of the plurality of raised projections 316c, 316d of locking device 317 should be frictionally engaged with the plurality of raised projections 316a, 316b of first inner arm 304a and second inner arm 306a.

Once the plurality of raised projections are frictionally engaged with one another as shown by 316a, 316c and 316b, 316d (FIG. 13), locking device 317 is substantially within recess 330, and first outer portion 318 and second outer portion 320 of first body 336 resiliently attempt to return to their original configuration of FIG. 16. By doing this, first outer portion 318 and second outer portion 320 move outwardly from first body 336 and frictionally engage with wall panels 340a and 340b, respectively. This engagement results in two additional seals formed at the interfaces of the first outer portion 318 and the wall panel 340a and the interfaces of the second outer portion 320 and the wall panel 340b.

In the final configuration of corner bracket 300, third outer portion 322 and fourth outer portion 324 also frictionally engage with portions of wall panels 340a and 340b, respectively. The frictional engagement between third outer portion 322 and wall panel 340a results in an additional seal between first body 336 of inner sealing body 312 and wall panels 340a. Similarly, the frictional engagement between fourth outer portion 324 and wall panel 340b also results in an additional seal between first body 336 of inner sealing body 312 and wall panel 340b. In effect, corner bracket 300 provides multiple fluid tight seals with wall panels 340a, 340b without using caulk or other additional materials for sealing purposes. In one embodiment, corner bracket 300 provides 3 pairs of seals to wall panels 340a, 340b.

Although the invention has been described in detail with reference to certain preferred embodiments, variations and modifications exist within the spirit and scope of the invention as described and defined in the following claims.

The invention claimed is:

1. A corner bracket for a shower enclosure comprising:
an outer receiver including an outer receiver body defining a first outer recess configured to receive a first wall panel, a second outer recess configured to receive a second wall panel, and a center recess positioned intermediate the first outer recess and the second outer recess;
the outer receiver body including a first inner arm, a first middle arm, and a first outer arm, the first outer arm and the first middle arm defining the first outer recess, and a second inner arm, a second middle arm and a second outer arm, the second outer arm and the second middle arm defining the second outer recess, the first inner arm and the second inner arm defining the center recess;
an insert operably coupled to the outer, the insert including an inner sealing body received within the center recess of the outer receiver body receiver and causing the first middle arm and the second middle arm of the outer receiver to spread toward the first wall panel and the second wall panel; and
a locking device supported by the outer receiver body and the inner sealing body, the locking device configured to secure the inner sealing body to the outer receiver body.

2. The corner bracket of claim 1, wherein:
the outer receiver body is formed of a first material;
the locking device is received within the center recess;
a first seal is supported on the first middle arm and extends into the first outer recess; and
a second seal is supported on the second middle arm and extends into the second outer recess.

3. The corner bracket of claim 2, wherein the locking device includes a first plurality of raised surfaces supported by the first inner arm and the second inner arm of the outer receiver body and extending into the third recess, and a second plurality of raised surfaces supported by the inner sealing body, the first plurality of raised surfaces configured to frictionally engage with the second plurality of raised surfaces.

4. The corner bracket of claim 3, wherein the inner sealing body further comprises:
a first body including a first outer portion, a second outer portion, a third outer portion, and a fourth outer portion; and
a second body coupled to the first body, the second body including a first arm and a second arm each including the second plurality of raised surfaces of the locking device.

5. The corner bracket of claim 4, wherein the first plurality of raised surfaces on the first inner arm and the second inner arm of the outer receiver body extend inwardly within the center recess, and the second plurality of raised surfaces on the first arm and the second arm of the inner sealing body extend outwardly into engagement with the first plurality of raised surfaces.

6. The corner bracket of claim 5, wherein the first plurality of raised surfaces include a first plurality of angled barbs, and the second plurality of raised surfaces include a second plurality of angled barbs configured to be positioned intermediate the first plurality of angled barbs.

7. The corner bracket of claim 4, wherein:
the outer receiver body and the second body of the inner sealing body are formed of a first material; and
the first seal, the second seal, and the first body of the inner sealing body are formed of a second material softer than the first material.

8. The corner bracket of claim 7, wherein the first seal, the second seal, and the outer receiver body are co-extruded, the outer receiver body being formed of a polymer, and the first seal and the second seal being formed of an elastomer.

9. The corner bracket of claim 7, wherein the first body and the second body of the inner sealing body are co-extruded, the second body being formed of a polymer, and the first body being formed of an elastomer.

10. A corner bracket for a shower enclosure comprising:
an outer receiver including an outer receiver body coupled to a first mounting stud and a second mounting stud,
the outer receiver body including a first inner arm, a first middle arm, and a first outer arm, the first outer arm and the first middle arm defining a first outer recess, the outer receiver body further including a second inner arm, a second middle arm, and a second outer arm, the second outer arm and the second middle arm defining a second outer recess, the first inner arm and the second inner arm defining a center recess,
wherein the first inner arm and the second inner arm include a plurality of raised surfaces extending into the center recess;
a first wall panel received within the first outer recess;
a second wall panel received within the second outer recess;

an insert including an inner sealing body received within the center recess of the outer receiver body;

a first seal supported on the first middle arm and extending into the first outer recess; and a second seal supported on the second middle arm and extending into the second outer recess;

wherein the outer receiver body is formed of a first material, the first seal and the second seal are formed of a second material softer than the first material.

11. The corner bracket of claim 10, further comprising a locking device supported by the outer receiver body and the inner sealing body, the locking device configured to secure the inner sealing body to the outer receiver body.

12. The corner bracket of claim 11, wherein the locking device includes a first plurality of raised surfaces supported by the first inner arm and the second inner arm of the outer receiver body and extending into the third recess, and a second plurality of raised surfaces supported by the inner sealing body, the first plurality of raised surfaces configured to frictionally engage with the second plurality of raised surfaces.

13. The corner bracket of claim 12, wherein the inner sealing body further comprises:

a first body including a first outer portion, a second outer portion, a third outer portion, and a fourth outer portion; and a second body coupled to the first body, the second body including a first arm and a second arm each including the second plurality of raised surfaces of the locking device.

14. The corner bracket of claim 13, wherein the first body of the inner sealing body forms fluid tight seals between the first outer portion and the first wall panel, the second outer portion and the second wall panel, the third outer portion and the first wall panel, and the fourth outer portion and the second wall panel.

15. The corner bracket of claim 12, wherein the first plurality of raised surfaces include a first plurality of angled barbs, and the second plurality of raised surfaces include a second plurality of angled barbs configured to be positioned intermediate the first plurality of angled barbs.

16. The corner bracket of claim 10, wherein the first seal forms a fluid tight seal against the first wall panel and the second seal forms a fluid tight seal against the second wall panel.

17. A method of forming a bathroom unit, the method comprising the steps of:

mounting an outer receiver of a corner bracket to a wall stud;

coupling a first wall panel to the outer receiver within a first recess of the outer receiver; and coupling a locking device of an inner sealing body to the outer receiver and coupling the inner sealing body to the first wall panel such that a fluid tight seal exists at the interface of the first wall panel and the inner sealing body.

18. The method of claim 17, wherein coupling the first wall panel to the outer receiver provides a fluid tight seal at the interface of a first seal of the outer receiver and the first wall panel.

19. The method of claim 17, wherein coupling the locking device of the inner sealing body to the outer receiver further comprises applying a force to the inner sealing body such that the locking device frictionally engages with the outer receiver.

20. The method of claim 17, wherein coupling the first wall panel to the outer receiver further comprises applying a force to the first wall panel such that the first wall panel frictionally engages with the outer receiver.

21. The method of claim 17, further comprising: coupling a second wall panel to the outer receiver within a second recess of the outer receiver.

22. The method of claim 21, wherein coupling the second wall panel to the outer receiver provides a fluid tight seal at the interface of a second seal of the outer receiver and the second wall panel.

23. The method of claim 21, wherein coupling of the second wall panel to the outer receiver further comprises applying a force to the second wall panel such that the second wall panel frictionally engages with the outer receiver.

* * * * *